US005999355A

United States Patent [19]
Behrens et al.

[11] Patent Number: 5,999,355
[45] Date of Patent: Dec. 7, 1999

[54] GAIN AND PHASE CONSTRAINED ADAPTIVE EQUALIZING FILTER IN A SAMPLED AMPLITUDE READ CHANNEL FOR MAGNETIC RECORDING

[75] Inventors: Richard T. Behrens, Louisville; William G. Bliss, Thornton; Li Du, Boulder; Mark S. Spurbeck, Louisville; German S. Feyh, Boulder; Trent O. Dudley, Littleton, all of Colo.

[73] Assignee: Cirrus Logic, Inc., Fremont, Calif.

[21] Appl. No.: 08/640,410

[22] Filed: Apr. 30, 1996

[51] Int. Cl.[6] .............................. G11B 5/035; G11B 5/09
[52] U.S. Cl. .............................. 360/65; 360/51; 375/232; 375/326; 375/346; 375/355
[58] Field of Search .............................. 360/46, 51, 65; 375/232, 233, 290, 326, 346, 355, 329

[56] References Cited

U.S. PATENT DOCUMENTS

| | | | |
|---|---|---|---|
| 5,060,088 | 10/1991 | Dolivo et al. | 360/46 |
| 5,150,379 | 9/1992 | Baugh et al. | 375/232 |
| 5,319,675 | 6/1994 | Cherubini | 364/724.2 |
| 5,359,631 | 10/1994 | Behrens et al. | 360/46 |
| 5,381,359 | 1/1995 | Abbott et al. | 360/40 |
| 5,384,725 | 1/1995 | Coifman et al. | 364/807 |
| 5,400,189 | 3/1995 | Sato et al. | 360/65 |
| 5,426,541 | 6/1995 | Coker et al. | 360/65 |
| 5,430,661 | 7/1995 | Fisher et al. | 344/488 |
| 5,450,253 | 9/1995 | Seki et al. | 360/65 |
| 5,467,370 | 11/1995 | Yamasaki et al. | 375/232 |
| 5,486,956 | 1/1996 | Urata | 360/65 |
| 5,487,085 | 1/1996 | Wong-Lam et al. | 375/230 |
| 5,559,833 | 9/1996 | Hayet | 375/259 |
| 5,561,598 | 10/1996 | Nowak et al. | 364/148 |
| 5,585,975 | 12/1996 | Bliss | 360/51 |
| 5,602,507 | 2/1997 | Suzuki | 329/304 |
| 5,695,639 | 12/1997 | Spurbeck et al. | 360/51 |
| 5,781,586 | 7/1998 | Tsutsui | 375/241 |

OTHER PUBLICATIONS

William L. Abbott, John M. Cioffi, and Hemant K. Thapar, "Channel Equalization Methods for Magnetic Storage", 1989 ICC '89, Boston, MA., Jun. 1989.

William L. Abbott et al., "A Digital Chip with Adaptive Equalizer for PRML Detection in Hard–Disk Drives", *IEEE International Solid–State Circuits Conference*, Feb. 18, 1994.

K. Ozeki and T. Umeda, "An Adaptive Filtering Algorithm Using an Orthogonal Projection to an Affine Subspace and Its Properties", *Electronics and Communications in Japan*, vol. 67–A, No. 5, 1984.

Simon Haykin, *Adaptive Filter Theory Second Edition*, Prentice Hall, 1991, pp. 383–385.

John M. Cioffi et al., "Adaptive Equalization In Magnetic–Disk Storage Channels", *IEEE Communications Magazine*, Feb. 1990, pp. 14–29.

*Primary Examiner*—Aristotelis M. Psitos
*Assistant Examiner*—Regina Y Neal
*Attorney, Agent, or Firm*—Howard H. Sheerin; Dan A. Shifrin

[57] ABSTRACT

A sampled amplitude read channel for magnetic disk recording which asynchronously samples the analog read signal, adaptively equalizes the resulting discrete time sample values according to a target partial response, extracts synchronous sample values through interpolated timing recovery, and detects digital data from the synchronous sample values using a Viterbi sequence detector is disclosed. To minimize interference from the timing and gain control loops, the phase and magnitude response of the adaptive equalizer filter are constrained at a predetermined frequency using an optimal orthogonal projection operation as a modification to a least mean square (LMS) adaptation algorithm. Further, with interpolated timing recovery, the equalizer filter and its associated latency are removed from the timing recovery loop, thereby allowing a higher order discrete time filter and a lower order analog filter.

26 Claims, 17 Drawing Sheets

GAIN AND PHASE CONSTRAINED ADAPTIVE EQUALIZING FILTER IN A SAMPLED AMPLITUDE READ CHANNEL FOR MAGNETIC RECORDING

CROSS REFERENCE TO RELATED APPLICATIONS AND PATENTS

This application is related to other U.S. patent applications, namely application Ser. No. 08/440,515 now U.S. Pat. No. 5,796,535 entitled "Sampled Amplitude Read Channel For Reading User Data and Embedded Servo Data From a Magnetic Medium," Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," Ser. No. 08/313,491 now U.S. Pat. No. 5,754,352 entitled "Improved Timing Recovery For Synchronous Partial Response Recording," and Ser. No. 08/533,797 now U.S. Pat. No. 5,793,548 entitled "Improved Fault Tolerant Sync Mark Detector For Sampled Amplitude Magnetic Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector," and U.S. Pat. No. 5,424,881 entitled "Synchronous Read Channel." All of the above-named patent applications and patents are assigned to the same entity, and all are incorporated herein by reference.

FIELD OF INVENTION

The present invention relates to the control of magnetic disk storage systems for digital computers, particularly to a method and apparatus for constraining the gain and phase response of an adaptive, discrete time equalizer filter in a sampled amplitude read channel for magnetic recording.

BACKGROUND OF THE INVENTION

In magnetic storage systems for computers, digital data serves to modulate the current in a read/write head coil in order to write a sequence of corresponding magnetic flux transitions onto the surface of a magnetic medium in concentric, radially spaced tracks at a predetermined baud rate. When reading this recorded data, the read/write head again passes over the magnetic medium and transduces the magnetic transitions into pulses in an analog read signal that alternate in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to channel noise. As a result, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL 2/3 rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate aliasing noise. After sampling, a digital equalizer filter equalizes the sample values according to a desired partial response, and a discrete time sequence detector, such as a Viterbi detector, interprets the equalized sample values in context to determine a most likely sequence for the digital data (i.e., maximum likelihood sequence detection (MLSD)). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, September 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, November 1991; and Carley et al, "Adaptive Continous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", *Intermag'90*.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the timing recovery decision-directed feedback system. The PLL comprises a phase detector for generating a phase error based on the difference between the estimated samples and the read signal samples. A PLL loop filter filters the phase error, and the filtered phase error operates to synchronize the channel samples to the baud rate. Conventionally, the phase error adjusts the frequency of a sampling clock which is typically the output of a variable frequency oscillator (VFO). The output of the VFO controls a sampling device, such as an analog-to-digital (A/D) converter, to synchronize the sampling to the baud rate.

As mentioned above, sampled amplitude read channels also commonly employ a discrete time equalizer filter to equalize the sample values into a desired partial response (PR4, EPR4, EEPR4, etc.) before sequence detection. To this end, adaptive algorithms have been applied to compensate in real time for parameter variations in the recording system and across the disk radius. For example, U.S. Pat. No. 5,381,359 entitled "Adaptation and Training of Digital Finite Impulse Response Filter within PRML Sampling Data Detection Channel", discloses an adaptive equalizer filter that operates according to a well known least mean square (LMS) algorithm, $$\underline{W}_{k+1} = \underline{W}_k - \mu \cdot e_k \cdot \underline{X}_k,$$

where $\underline{W}_k$ represents a vector of filter coefficients; $\mu$ is a programmable gain; $e_k$ represents a sample error between the filter's actual output and a desired output; and $\underline{X}_k$ represents a vector of sample values from the filter input. In other words, the LMS adaptive equalizer filter is a closed loop feedback system that attempts to minimize the mean squared error between an actual output of the filter and a desired output by continuously adjusting the filter's coefficients to achieve an optimum frequency response.

A problem associated with adaptive equalizer filters in sampled amplitude read channels is that the timing recovery and gain control loops can interfere with the adaptive feedback loop, thereby preventing the adaptive equalizer filter from converging to an optimal state. This non-convergence is manifested by the filter's phase and gain response drifting as it competes with the timing and gain control loops. An article by J. D. Coker et al. entitled "Implementation of PRML in a Rigid Disk Drive", published in IEEE Transactions on Magnetics, vol. 27, No. 6, November 1991, suggests a three tap transversal filter comprising a fixed center tap and symmetric side taps in order to constrain the phase response of the equalizer filter except in terms of a fixed group delay. Constraining the phase response of the adaptive equalizer in this manner, however, is a very sub-optimal method for attenuating interference from the timing recovery and gain control loops. Furthermore, it significantly reduces control over the adaptive filter's phase response, thereby placing the burden of phase compensation on the analog equalizer.

Yet another problem associated with conventional adaptive equalizer filters is an inherent limitation on its order (i.e., the number of coefficients): because the adaptive equalizer is inside the timing recovery feedback loop, its order must be limited to minimize the associated transport delay. Compensating for the deficiencies of the discrete time equalizer requires filtering the analog read signal with a higher order analog equalizer prior to the timing recovery loop, which is undesirable.

There is, therefore, a need for an adaptive, discrete time equalizer filter in a sampled amplitude read channel having an improved method for constraining the phase and gain response in order to minimize interference from the timing recovery and gain control loops. A further aspect of the present invention is to remove the adaptive equalizer, and its associated latency, from the timing recovery loop, thereby allowing a higher order discrete time filter and a simplified analog filter.

SUMMARY OF THE INVENTION

A sampled amplitude read channel for magnetic disk recording which asynchronously samples the analog read signal, adaptively equalizes the resulting discrete time sample values according to a target partial response, extracts synchronous sample values through interpolated timing recovery, and detects digital data from the synchronous sample values using a Viterbi sequence detector is disclosed. To minimize interference from the timing and gain control loops, the phase and magnitude response of the adaptive equalizer filter are constrained at a predetermined frequency using an optimal orthogonal projection operation as a modification to a least mean square (LMS) adaptation algorithm. Further, with interpolated timing recovery, the equalizer filter and its associated latency are removed from the timing recovery loop, thereby allowing a higher order discrete time filter and a lower order analog filter.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Conventional Sampled Amplitude Read Channel

Figure 1:
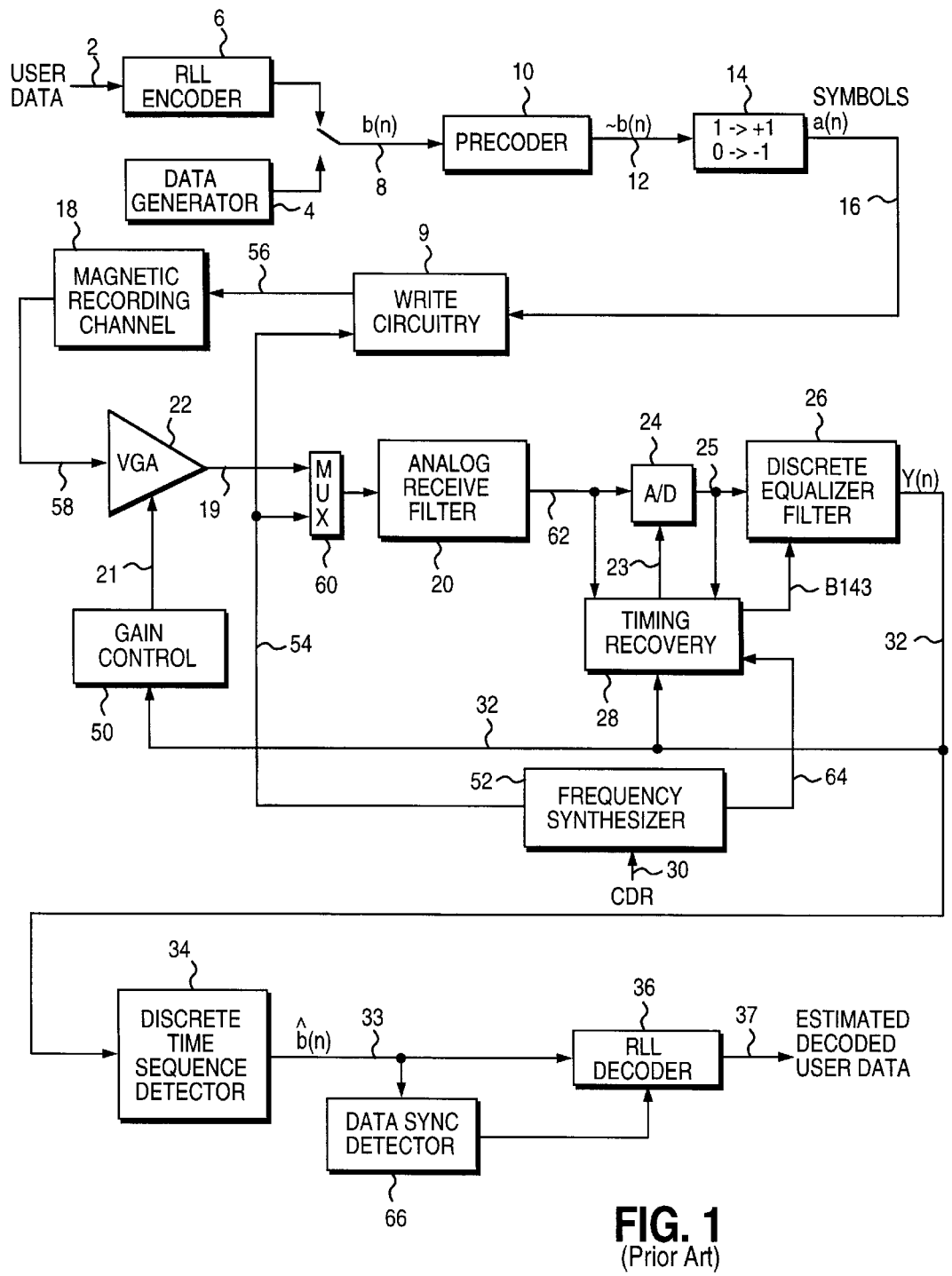
FIG. 1 is a block diagram of a conventional sampled amplitude recording channel.

Referring now to FIG. 1, shown is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to acquire an acquisition preamble recorded on the disk prior to the recorded user data. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1.

The discrete equalizer filter 26 may be implemented as a real-time adaptive filter which compensates for parameter variations over the disk radius (i.e., zones), disk angle, and environmental conditions such as temperature drift. To this end, the filter 26 receives estimated sample values B143 generated by the timing recovery circuit 28; the estimated samples being input into an adaptive feedback loop and used to generate sample errors. The adaptive feedback loop conventionally employs a least mean square (LMS) algorithm to adapt the filter coefficients (i.e., it adapts the frequency and phase response of the filter) until a minimum sample error is achieved. Operation of a conventional adaptive equalizer filter is discussed in greater detail below.

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. The channel data rate (CDR) 30 signal adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples Y(n) 32 are also sent to a discrete time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 from the sequence detector 34 into estimated user data 37. A data sync detector 66 detects the sync mark 70 (shown in FIG. 2B) in the data sector 15 in order to frame operation of the RLL decoder 36. In the absence of errors, the estimated binary sequence ^b(n) 33 matches the recorded binary sequence b(n) 8, and the decoded user data 37 matches the recorded user data 2.

Data Format

Figure 2A:
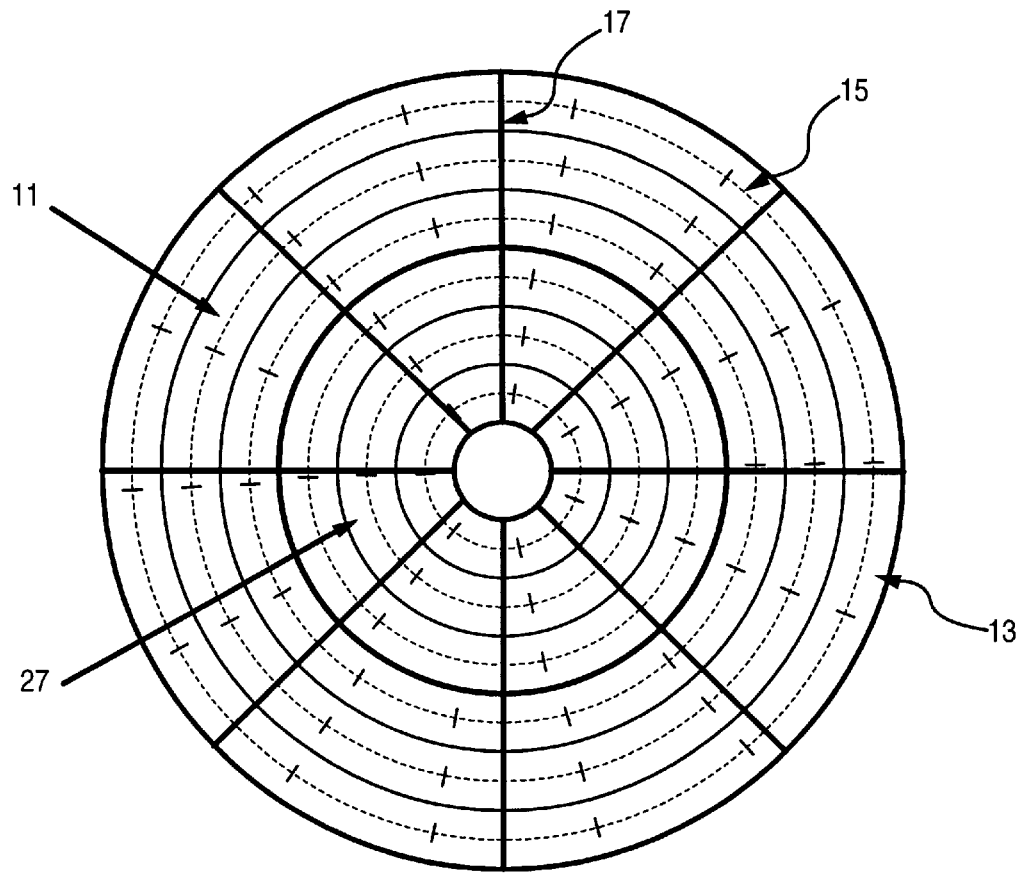
FIG. 2A shows an exemplary data format of a magnetic disk having a plurality of concentric tracks comprised of a plurality of user data sectors and embedded servo data sectors.

FIG. 2A shows an exemplary data format of a magnetic media comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The servo wedges 17 may be detected by a simple discrete time pulse detector or by the discrete time sequence detector 34. If the sequence detector 34 detects the servo data, then the format of the servo wedges 17 includes a preamble and a sync mark, similar to the user data sectors 15.

Figure 2B:
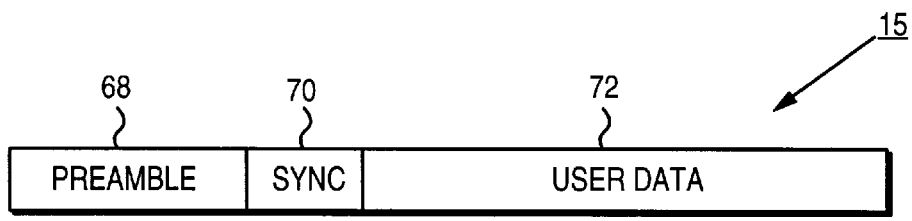
FIG. 2B shows an exemplary format of a user data sector.

FIG. 2B shows the format of a user data sector 15 comprising V an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72 (see co-pending U.S. patent application Ser. No. 08/313,491 entitled "Improved Timing Recovery For Synchronous Partial Response Recording").

To increase the overall storage density, the disk is partitioned into an outer zone 11 comprising fourteen data sectors per track, and an inner zone 27 comprising seven data sectors per track. In practice, the disk is actually partitioned into several zones with a different number of sectors in each zone, and the data recorded and detected at a different data rate in each zone.

Improved Sampled Amplitude Read Channel

Figure 3:
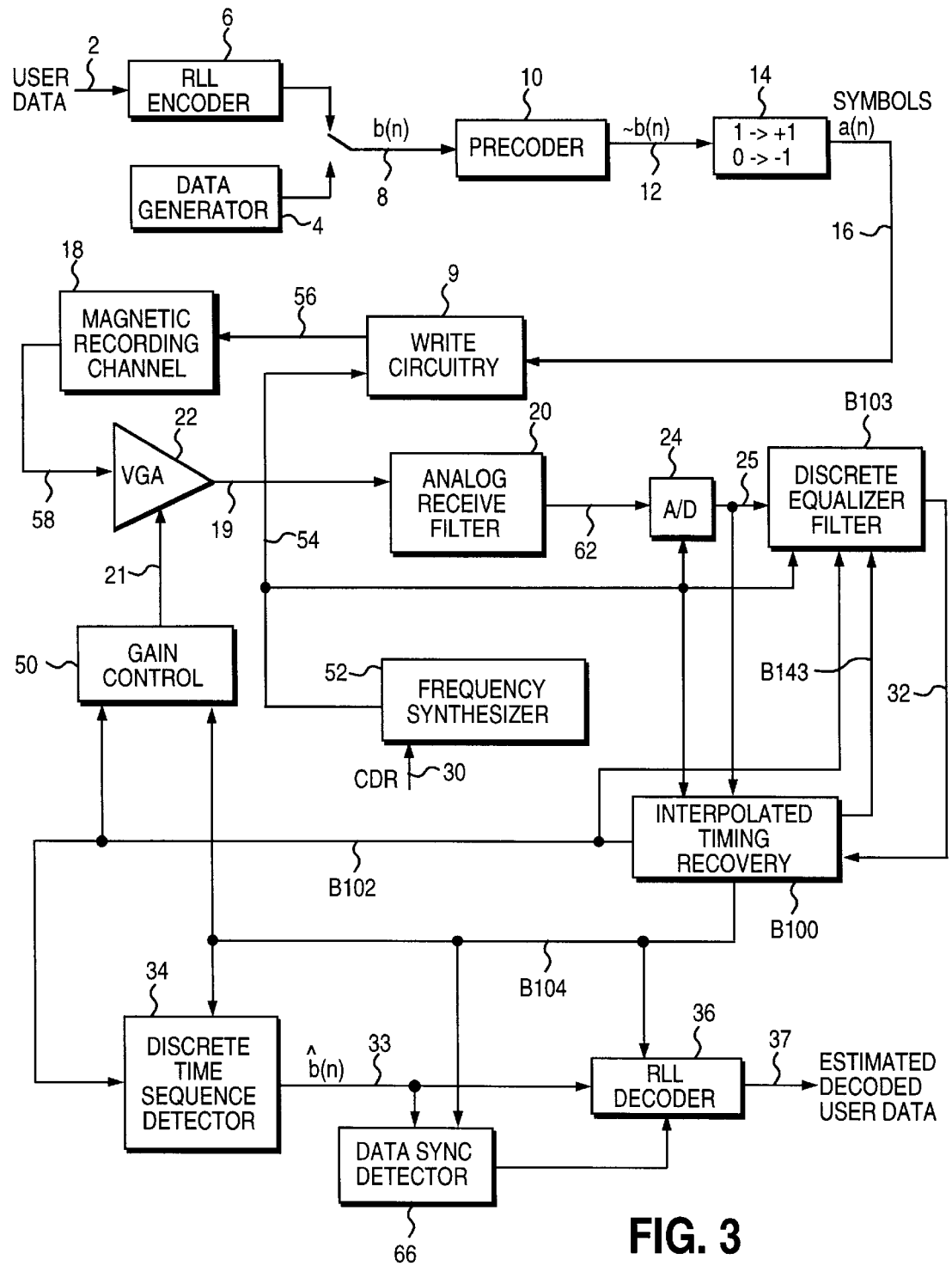
FIG. 3 is a block diagram of the improved sampled amplitude read channel of the present invention comprising interpolated timing recovery for generating interpolated sample values and a synchronous data clock for clocking operation of a discrete time sequence detector.

FIG. 3 shows the improved sampled amplitude read channel of the present invention wherein the conventional sampled timing recovery 28 of FIG. 1 has been replaced by interpolated timing recovery B100. In addition, the write frequency synthesizer 52 generates a baud rate write clock 54 applied to the write circuitry 9, and an asynchronous read clock 54 for clocking the sampling device 24, the discrete time equalizer filter B103, and the interpolated timing recovery B100 at a frequency relative to the current zone (CDR 30). In an alternative embodiment, a first frequency synthesizer generates the write clock, and a second frequency synthesizer generates the read clock.

The discrete equalizer filter B103 is real-time adaptive, receiving interpolated sample values B102 and estimated sample values B143 from the interpolated timing recovery circuit B100 for use in a modified least mean square (LMS) algorithm which constrains the filter's gain and phase response according to the present invention, the details of which are set forth below.

The interpolated timing recovery B100 interpolates the equalized sample values 32 to generate interpolated sample values B102 substantially synchronized to the data rate of the current zone. A discrete time sequence detector 34 detects an estimated binary sequence 33 representing the user data from the interpolated sample values B102. The interpolated timing recovery B100 circuit generates a synchronous data clock B104 for clocking operation of the gain control 50, discrete time sequence detector 34, sync mark detector 66 and RLL decoder 36.

Conventional Timing Recovery

Figure 4A:
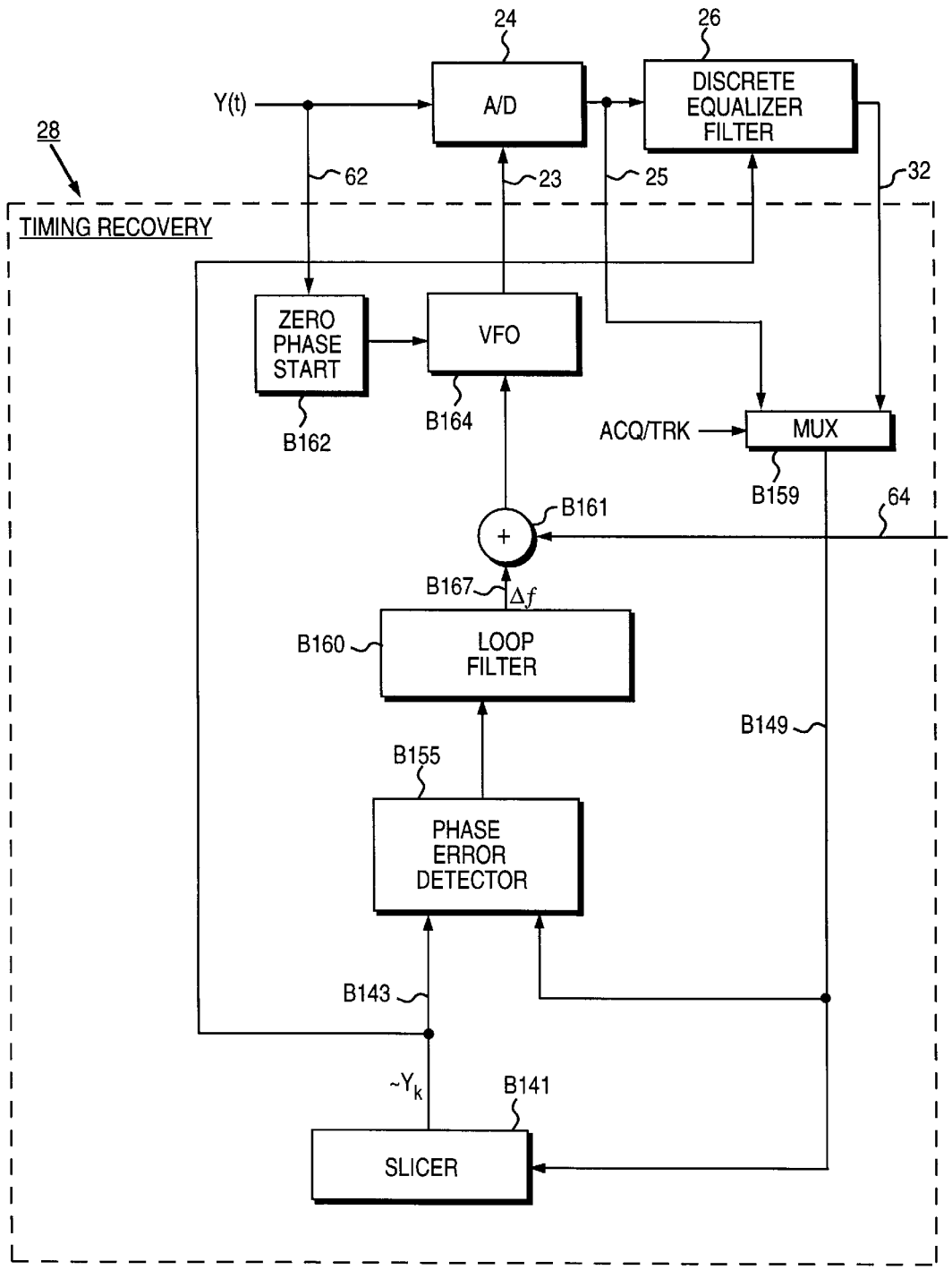
FIG. 4A is a detailed block diagram of the prior art sampling timing recovery comprising a sampling VFO.

An overview of the conventional sampling timing recovery 28 of FIG. 1 is shown in FIG. 4A. The output 23 of a variable frequency oscillator (VFO) B164 controls the sampling clock of a sampling device 24 which is typically an analog-to-digital converter (A/D) in digital read channels. A multiplexor B159 selects the unequalized sample values 25 during acquisition and the equalized sample values 32 during tracking, thereby removing the discrete equalizer filter 26 from the timing loop during acquisition in order to avoid its associated latency. A phase error detector B155 generates a phase error in response to the sample values received over line B149 and estimated sample values $\sim Y_k$ from a sample value estimator B141, such as a slicer in a d=0 PR4 read channel, over line B143. A loop filter B160 filters the phase error to generate a frequency offset $\Delta f$ B167 that settles to a value proportional to a frequency difference between the sampling clock 23 and the baud rate. The frequency offset $\Delta f$ B167, together with the center frequency control signal 64 from the frequency synthesizer 52, adjust the sampling clock 23 at the output of the VFO B164 in order to synchronize the sampling to the baud rate.

A zero phase start B162 circuit suspends operation of the VFO B164 at the beginning of acquisition in order to minimize the initial phase error between the sampling clock 23 and the read signal 62. This is achieved by disabling the VFO B164, detecting a zero crossing in the analog read signal 62, and re-enabling the VFO B164 after a predetermined delay between the detected zero crossing and the first baud rate sample.

The estimated sample values B143 at the output of the slicer B141 are also input into the discrete time equalizer filter 26 of FIG. 1 for use in a conventional least mean square (LMS) adaptation algorithm as is described in more detail below.

Interpolated Timing Recovery

Figure 4B:
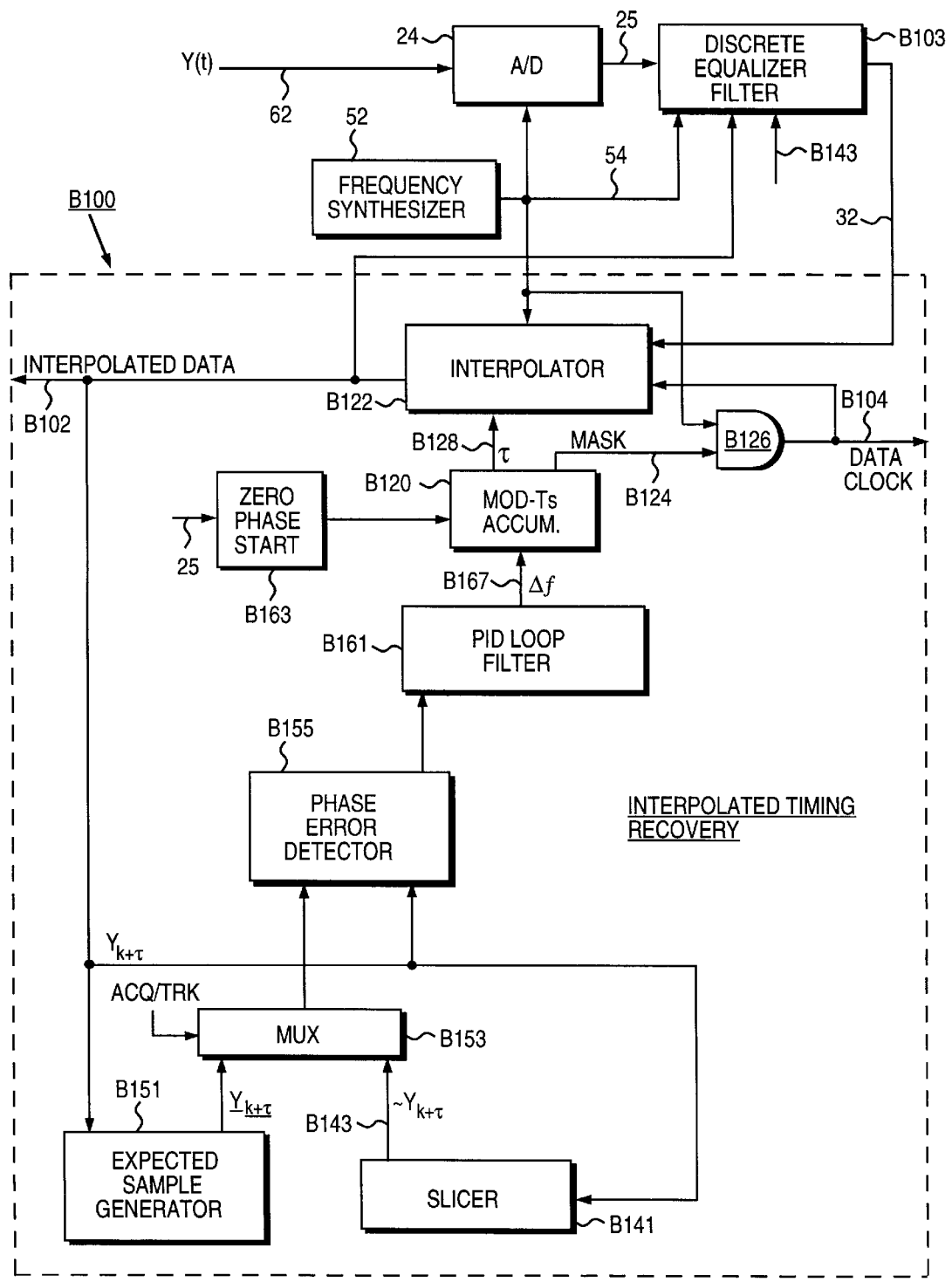
FIG. 4B is a detailed block diagram of the interpolating timing recovery of the present invention comprising an interpolator.

The interpolated timing recovery B100 of the present invention is shown in FIG. 4B. The VFO B164 in the conventional timing recovery of FIG. 4A is replaced with a modulo-Ts accumulator B120 and an interpolator B122. In addition, an expected sample value generator B151, responsive to interpolated sample values B102, generates expected samples $Y_{k+\tau}$ used by the phase error detector B155 to compute the phase error during acquisition. A multiplexor B153 selects the estimated sample values $\sim Y_{k+\tau}$ from the slicer B141 for use by the phase error detector B155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response similar to the loop filter B160 of FIG. 4A.

The interpolated sample values $Y_{k+\tau}$, B102 and the estimated sample values $\sim Y_{k+\tau}$ from the slicer B141 are input into the adaptive, discrete equalizer filter B103 of FIG. 3 for use by a modified least mean square (LMS) algorithm, the details of which are set forth below.

In the interpolated timing recovery of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer filter 26, together with their associated delays, have been removed from the timing recovery loop;

it is not necessary to multiplex B159 around the equalizer filter 26 between acquisition and tracking. However, it is still necessary to acquire a preamble 68 before tracking the user data 72. To this end, a zero phase start circuit B163 minimizes the initial phase error between the interpolated sample values and the baud rate at the beginning of acquisition similar to the zero phase start circuit B162 of FIG. 4A. However, rather than suspend operation of a sampling VFO B164, the zero phase start circuit B163 for interpolated timing recovery computes an initial phase error τ from the A/D 24 sample values 25 and loads this initial phase error into the modulo-Ts accumulator B120.

For more details concerning the PID loop filter B161, phase error detector B155, expected sample generator B151, and slicer B141, refer to the above referenced co-pending U.S. patent applications "Sampled Amplitude Read Channel Comprising Sample Estimation Equalization, Defect Scanning, Channel Quality, Digital Servo Demodulation, PID Filter for Timing Recovery, and DC Offset Control" and "Improved Timing Recovery For Synchronous Partial Response Recording." A detailed description of the modulo-Ts accumulator B120, data clock B104, and interpolator B122 is provided in the following discussion.

Interpolator

Figure 5:
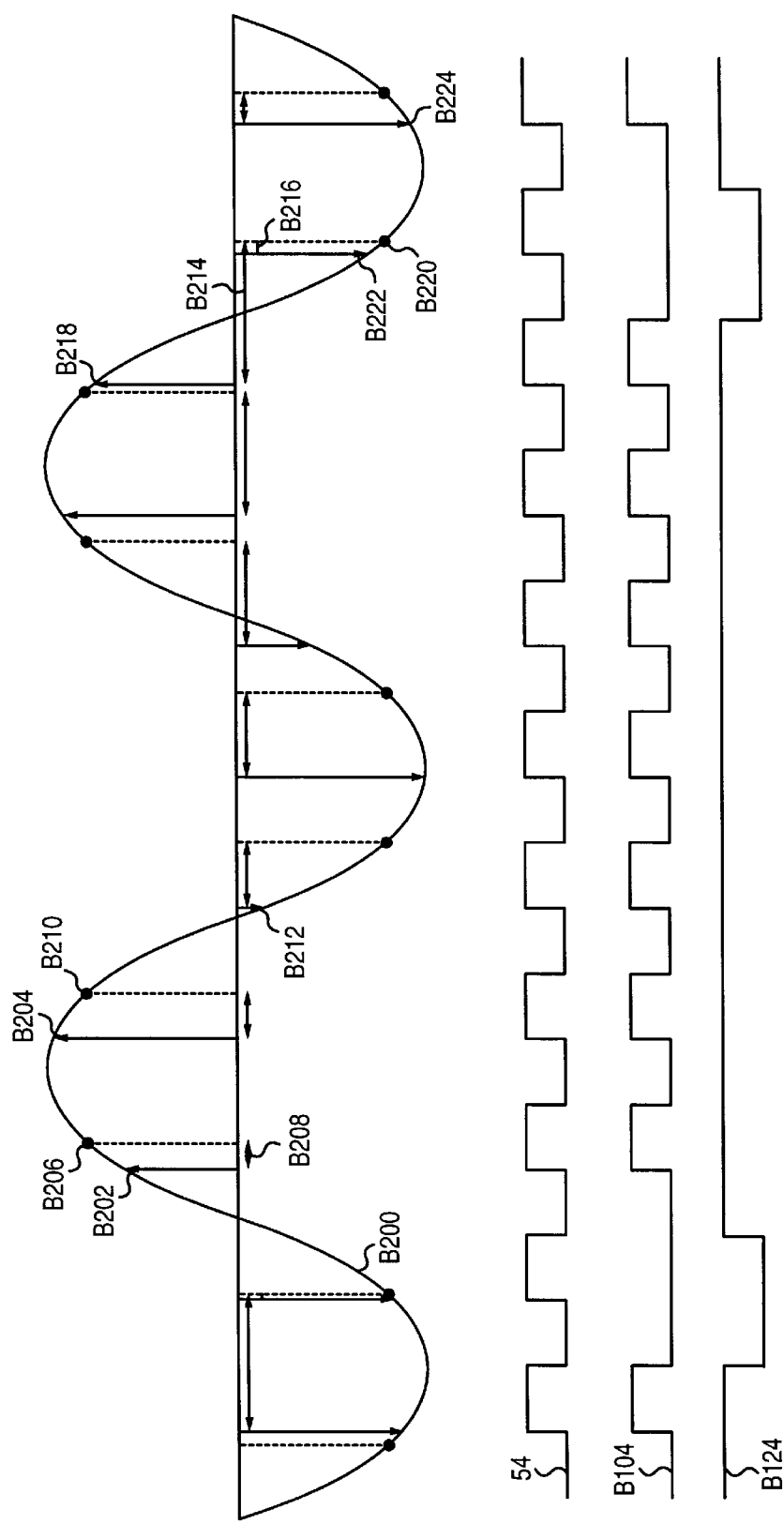
FIG. 5 illustrates the channel samples in relation to the interpolated baud rate samples for the acquisition preamble.

The interpolator B122 of FIG. 4B is understood with reference to FIG. 5 which shows a sampled 2T acquisition preamble signal B200. The target synchronous sample values B102 are shown as black circles and the asynchronous channel sample values 32 as vertical arrows. Beneath the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1) = x(N-1) + \tau \cdot (x(N) - x(N-1)); \text{ where:} \tag{1}$$

x(N−1) and x(N) are the channel samples surrounding the target sample; and T is an interpolation interval proportional to a time difference between the channel sample value x(N−1) and the target sample value. The interpolation interval τ is generated at the output of modulo-Ts accumulator B120 which accumulates the frequency offset signal Δf B167 at the output of the PID loop filter B161:

$$\tau = \left(\sum \Delta f\right) \text{MOD } TS; \text{ where:} \tag{2}$$

Ts is the sampling period of the sampling clock 54. Since the sampling clock 54 samples the analog read signal 62 slightly faster than the baud rate, it is necessary to mask the data clock every time the accumulated frequency offset Δf, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval τ B208 is generated according to equation (2) above. The next interpolated sample value corresponding to the next target value B210 is computed from channel sample values B204 and B212. This process continues until the interpolation interval τ B214 would be greater than Ts except that it "wraps" around and is actually τ B216 (i.e., the accumulated frequency offset Δf, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of τ:

$$C_\tau(e^{j\omega}) = e^{j\omega\tau} \tag{3}$$

which has an ideal impulse response:

$$\sin c(\pi \cdot (n - \tau/T_s)) \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega})); \text{ where:} \tag{5}$$

$\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 d\omega; \text{ where:} \tag{6}$$

$X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ as where $0 < \alpha < 1$; that is:

$$|X(e^{j\omega})| = 0, \text{ for } |\omega| \geq \alpha\pi.$$

Then equation (6) can be expressed as:

$$E_{\tau,\alpha}^2 = \frac{1}{2\pi} \int_{-\alpha\pi}^{\alpha\pi} |\overline{C}_\tau(e^{j\omega}) - e^{j\omega\tau}|^2 |X(e^{j\omega})|^2 d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n)e^{-j\omega n}; \text{ where:} \quad (8)$$

2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi}\int_{-\alpha\pi}^{\alpha\pi}\left|\sum_{n=-R}^{n=R-1} C_\tau(n)e^{-j\omega n} - e^{j\omega\tau}\right|^2 |X(e^{j\omega})|^2 d\omega. \quad (9)$$

The next step is to take the derivatives of equation (9) with respect to the coefficients $C_\tau(n)$ and set them to zero:

$$\frac{\partial E_{\tau,\alpha}^2}{\partial c_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi}\left[\left(\sum_{n=-R}^{n=R-1} C_\tau(n)\cos(\omega(n_o - n))\right) - \cos(\omega(n_o + \tau))\right]|X(e^{j\omega})|^2 d\omega = 0 \quad (11)$$

$$\text{for } n_o = -R, \ldots, 0, 1, \ldots, R-1.$$

Defining $\phi(r)$ as:

$$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} C_\tau(n)\phi(n - n_o) = \phi(n_0 - \tau) \quad (13)$$

$$\text{for } n_o = -R, \ldots, 0, 1, \ldots, R-1.$$

Equation (13) defines a set of 2R linear equations in terms of the coefficients $C_\tau(n)$. Equation (13) can be expressed more compactly in matrix form:

$$\Phi_T C_\tau = \Phi_\tau; \text{ where:}$$

$C_\tau$ is a column vector of the form:

$$C_\tau = [c_\tau(-R), \ldots, c_\tau(0), \ldots, c_\tau(R-1)]^t$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \vdots & & & \vdots \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t \quad (14)$$

The solution to equation (14) is:

$$C_\tau = \Phi_T^{-1}\Phi_\tau; \text{ where:} \quad (15)$$

$\Phi_T^{-1}$ is an inverse matrix that can be solved using well known methods.

Figure 6:
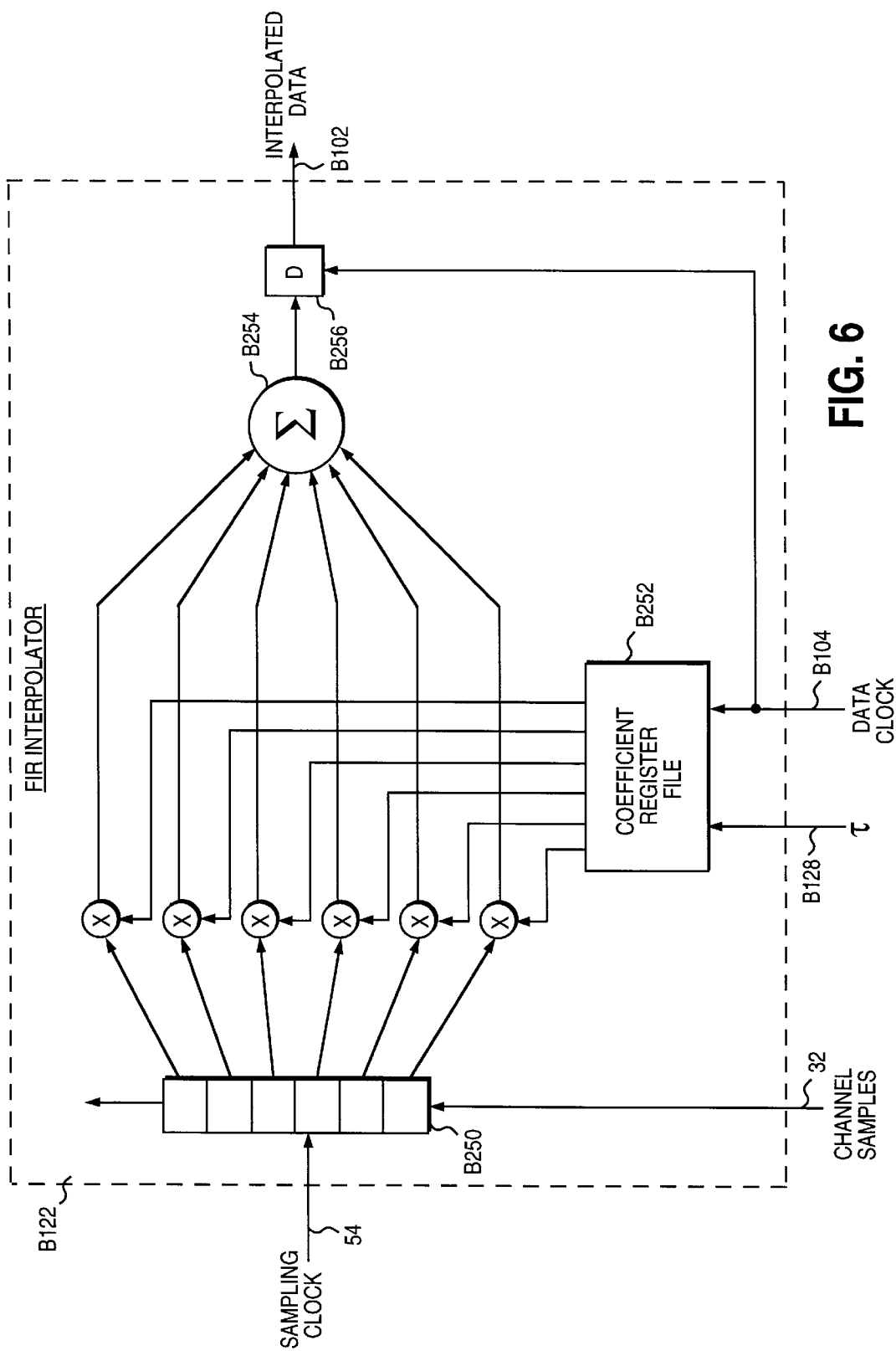
FIG. 6 shows an FIR filter implementation for the timing recovery interpolator.

Table B2 shows example coefficients $c_\tau(n)$ calculated from equation (15) with 2R=6, $\alpha$=0.8 and $X(e^{j\omega})$=PR4. The implementation of the six tap FIR filter is shown in FIG. 6. A shift register B250 receives the channel samples 32 at the sampling clock rate 54. The filter coefficients $C_\tau(n)$ are stored in a coefficient register file B252 and applied to corresponding multipliers according to the current value of $\tau$ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of $\tau$, filter the sample values in the shift register B250. Each filter outputs an interpolation value, and the current value of the interpolation interval $\tau$ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

Cost Reduced Interpolator

Rather than store all of the coefficients of the interpolation filters in memory, in a more efficient, cost reduced implementation the coefficient register file B252 of FIG. 6 computes the filter coefficients $C_\tau(n)$ in real time as a function of $\tau$. For example, the filter coefficients $C_\tau(n)$ can be computed in real time according to a predetermined polynomial in $\tau$ (see, for example, U.S. Pat. No. 4,866,647 issued to Farrow entitled, "A Continuously Variable Digital Delay Circuit," the disclosure of which is hereby incorporated by reference). An alternative, preferred embodiment for computing the filter coefficients in real time estimates the filter coefficients according to a reduced rank matrix representation of the coefficients.

The bank of filter coefficients stored in the coefficient register file B252 can be represented as an M×N matrix $A_{M\times N}$, where N is the depth of the interpolation filter (i.e., the number of coefficients $C_\tau(n)$ in the impulse response computed according to equation (15)) and M is the number of interpolation intervals (i.e., the number of $\tau$ intervals). Rather than store the entire $A_{M\times N}$ matrix in memory, a more efficient, cost reduced implementation is attained through factorization and singular value decomposition (SVD) of the $A_{M\times N}$ matrix.

Consider that the $A_{M\times N}$ matrix can be factored into an $F_{M\times N}$ and $G_{N\times N}$ matrix, $$A_{M \times N} = F_{M \times N} \cdot G_{N \times N}.$$

Then a reduced rank approximation of the $A_{M \times N}$ matrix can be formed by reducing the size of the $F_{M \times N}$ and $G_{N \times N}$ matrices by replacing N with L where L<N and, preferably, L<<N. Stated differently, find the $F_{M \times L}$ and $G_{L \times N}$ matrices whose product best approximates the $A_{M \times N}$ matrix, $$A_{M \times N} \approx F_{M \times L} \cdot G_{L \times N}.$$

Figure 7:
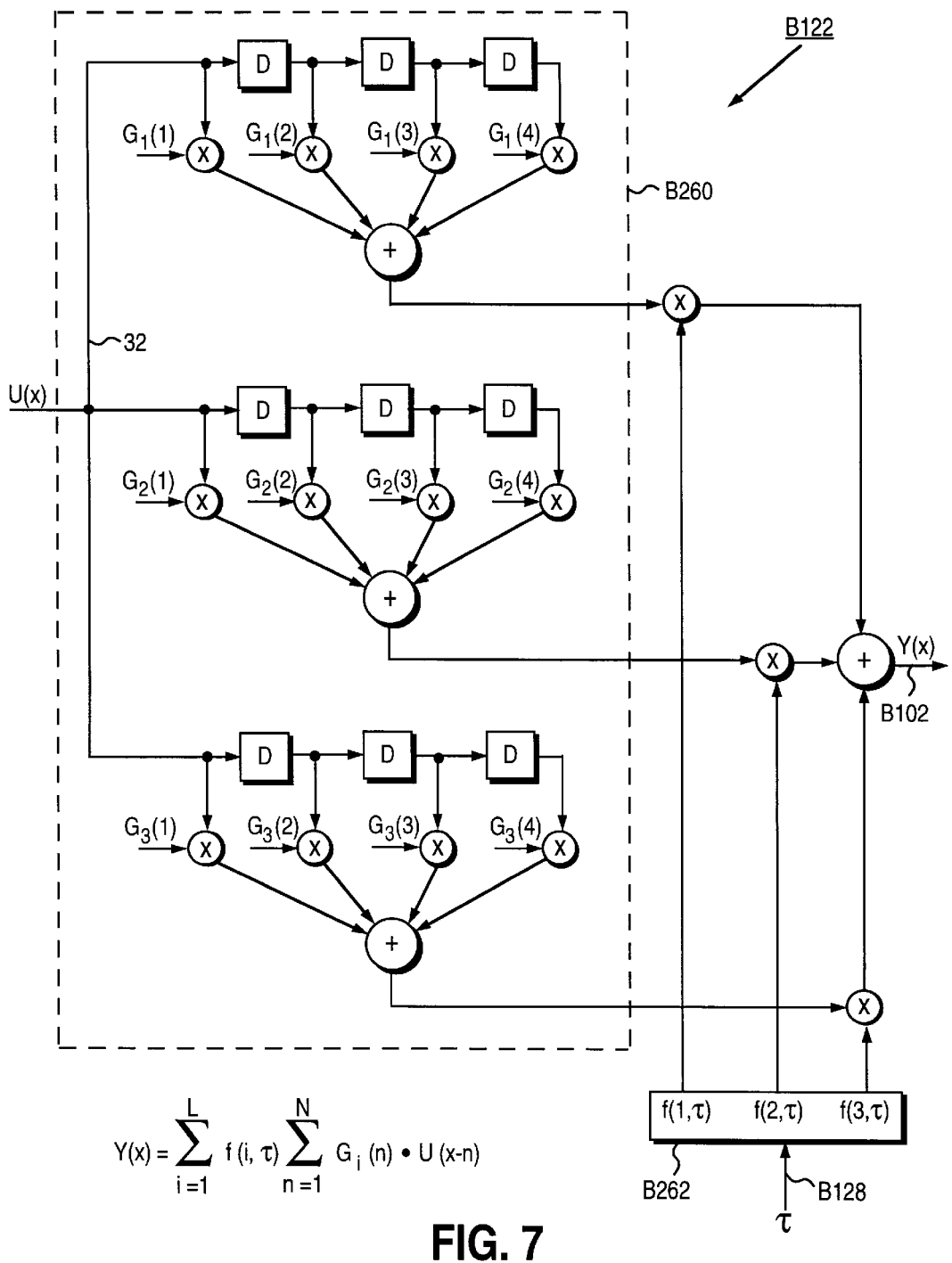
FIG. 7 depicts a cost reduced implementation for the timing recovery interpolator.

The convolution process of the interpolation filter can then be carried out, as shown in FIG. 7, by implementing the $G_{L \times N}$ matrix as a bank of FIR filters B260 connected to receive the channel sample values 32, and the $F_{M \times L}$ matrix implemented as a lookup table B262 indexed by $\tau$ B128 (as will become more apparent in the following discussion). Those skilled in the art will recognize that, in an alternative embodiment, the $A_{M \times N}$ matrix can be factored into more than two matrices (i.e., A≈FGH . . . ).

The preferred method for finding the $F_{M \times L}$ and $G_{L \times N}$ matrices is to minimize the following sum of squared errors:

$$\sum_{j=1}^{M} \sum_{n=1}^{N} (A_{jn} - (F_{M \times L} \cdot G_{L \times N})_{jn})^2 \quad (16)$$

The solution to equation (16) can be derived through a singular value decomposition of the $A_{M \times N}$ matrix, comprising the steps of:

1. performing an SVD on the $A_{M \times N}$ matrix which gives the following unique factorization (assuming M≧N):

$$A_{M \times N} = U_{M \times N} \cdot D_{N \times N} \cdot V_{N \times N} \text{ where:}$$

$U_{M \times N}$ is a M×N unitary matrix;

$D_{N \times N}$ is a N×N diagonal matrix $\{\sigma_1, \sigma_2, \ldots, \sigma_N\}$ where $\sigma_i$ are the singular values of $A_{M \times N}$, and $\sigma_1 \geq \sigma_2 \ldots \geq \sigma_N \geq 0$; and $V_{N \times N}$ is a N×N unitary matrix;

2. selecting a predetermined L number of the largest singular values $\sigma$ to generate a reduced size diagonal matrix $D_{L \times L}$:

$$D_{L \times L} = \text{Diag}\{\sigma_1, \sigma_2, \ldots, \sigma_L\} = \begin{bmatrix} \sigma_1 & 0 & \ldots & 0 \\ 0 & \sigma_2 & 0 \ldots & \vdots \\ \vdots & \ldots & \ldots & 0 \\ 0 & \ldots & 0 & \sigma_L \end{bmatrix}$$

3. extracting the first L columns from the $U_{M \times N}$ matrix to form a reduced $U_{M \times L}$ matrix:

$$U_{M \times L} = \begin{bmatrix} \begin{bmatrix} U_{1,1} & \ldots & U_{1,L} \\ \vdots & \ldots & \ldots \\ \vdots & \ldots & \ldots \\ U_{M,1} & \ldots & U_{M,L} \end{bmatrix} & \begin{matrix} \ldots & U_{1,N} \\ \ldots & \vdots \\ \ldots & \vdots \\ \ldots & U_{M,N} \end{matrix} \end{bmatrix}$$

4. extracting the first L rows from the $V_{N \times N}$ matrix to form a reduced $V_{L \times N}$ matrix:

$$V_{L \times N} = \begin{bmatrix} \begin{bmatrix} V_{1,1} & \ldots & V_{1,N} \\ \vdots & \ldots & \vdots \\ V_{L,1} & \ldots & V_{L,N} \end{bmatrix} \\ \vdots & \ldots & \vdots \\ V_{N,1} & \ldots & V_{N,N} \end{bmatrix}$$

5. defining the $F_{M \times L}$ and $G_{L \times N}$ matrices such that:

$$F_{M \times L} \cdot G_{L \times N} = U_{M \times L} \cdot D_{L \times L} \cdot V_{L \times N} \approx A_{M \times N}$$

(for example, let $F_{M \times L} = U_{M \times L} \cdot D_{L \times L}$ and $G_{L \times N} = V_{L \times N}$).

In the above cost reduced polynomial and reduced rank matrix embodiments, the interpolation filter coefficients $C_\tau(n)$ are computed in real time as a function of $\tau$; that is, the filter's impulse response h(n) is approximated according to:

$$h(n, \tau) = c_\tau(n) = \sum_{i=1}^{L} G_i(n) \cdot f(i, \tau); \text{ where:} \quad (17)$$

$f(i,\tau)$ is a predetermined function in $\tau$ (e.g., polynomial in $\tau$ or $\tau$ indexes the above $F_{M \times L}$ matrix); L is a degree which determines the accuracy of the approximation (e.g., the order of the polynomial or the column size of the above $F_{M \times L}$ matrix); and $G_i(n)$ is a predetermined matrix (e.g., the coefficients of the polynomial or the above $G_{L \times N}$ matrix). As L increases, the approximated filter coefficients $C_\tau(n)$ of equation (17) tend toward the ideal coefficients derived from equation (15). It follows from equation (17) that the output of the interpolation filter Y(x) can be represented as:

$$Y(x) = \sum_{n=1}^{N} U(x - n) \sum_{i=1}^{L} G_i(n) \cdot f(i, \tau) \quad (18)$$

where U(x) are the channel sample values 32 and N is the number of interpolation filter coefficients $c_\tau(n)$.

Referring again to FIG. 6, the coefficient register file can compute the interpolation filter coefficients $C_\tau(n)$ according to equation (17) and then convolve the coefficients $C_\tau(n)$ according to channel samples U(x) 32 to generate the interpolated sample values B102 synchronized to the baud rate. However, a more efficient implementation of the interpolation filter can be achieved by rearranging equation (18):

$$Y(x) = \sum_{i=1}^{L} f(i, \tau) \sum_{n=1}^{N} G_i(n) \cdot U(x - n) \quad (19)$$

FIG. 7 shows the preferred embodiment of the interpolation filter according to equation (19). In the polynomial embodiment, the function of $\tau$ is a polynomial in $\tau$, and the matrix $G_i(n)$ are the coefficients of the polynomial. And in the reduced rank matrix embodiment, the function of $\tau$ is to index the above $F_{M \times L}$ matrix B262, and the second summation in equation (19), $$\sum_{n=1}^{N} G_i(n) \cdot U(x-n)$$

is implemented as a bank of FIR filters B260 as shown in FIG. 7. Again, in equation (19) L is the depth of the approximation function f(i,τ) (e.g., the order of the polynomial or the column size of the above $F_{M \times L}$ matrix) and N is the depth of the interpolation filter's impulse response (i.e., the number of coefficients in the impulse response). It has been determined that N=8 and L=3 provides the best performance/cost balance; however, these values may increase as IC technology progresses and the cost per gate decreases.

Conventional Adaptive Equalizer

Figure 8A:
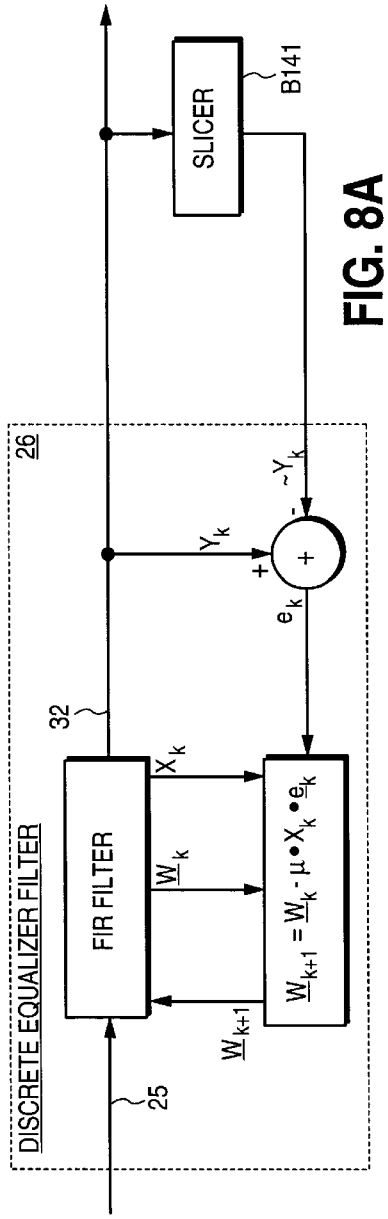
FIG. 8A is a block diagram of a conventional adaptive, discrete time equalizer filter in a sampled amplitude read channel.

FIG. 8A illustrates a prior art adaptive, discrete time equalizer that operates according to the well known least mean square (LMS) algorithm, $$\underline{W}_{k+1} = \underline{W}_k - \mu \cdot e_k \cdot \underline{X}_k,$$

or alternatively, $$\underline{W}_{k+1} = \underline{W}_k - \mu \cdot X_k \cdot \underline{e}_k$$

where $\underline{W}_k$ represents a vector of FIR filter coefficients; $\mu$ is a programmable gain; $e_k$ represents a sample error (or vector of sample errors $\underline{e}_k$) between the FIR filter's actual output and a desired output; and $\underline{X}_k$ represents a vector of samples values (or a scalar $X_k$) from the FIR filter input. To better understand operation of the present invention, the second representation of the LMS algorithm is used throughout this disclosure.

The desired filter output is the estimated sample values ~$Y_k$ at the output of slicer B141. The estimated sample values ~$Y_k$ are subtracted from the FIR filter's output $Y_k$ to generate the sample error $e_k$. The LMS algorithm attempts to minimize the sample error in a least mean square sense by adapting the FIR filter coefficients; that is, it adjusts the FIR filter's gain and phase response so that the overall channel response adequately tracks the desired partial response (e.g., PR4, EPR4, EEPR4, etc.).

As previously mentioned, interference from the timing recovery 28 and gain control 50 loops can prevent the adaptive, discrete time equalizer 26 from converging to an optimal state. For example, a phase adjustment in the adaptive filter 26 can affect the sampling phase error for timing recovery 28. Timing recovery 28 compensates for the filter's phase adjustment by adjusting its sampling phase; this adjustment can result in yet another phase adjustment by the adaptive equalizer 26. Thus, the phase response of the adaptive equalizer 26 may never converge. Similarly, the gain control loop 50 can interfere with the gain response of the adaptive filter 26 and prevent it from converging.

Constrained Adaptive Equalizer

Figure 8B:
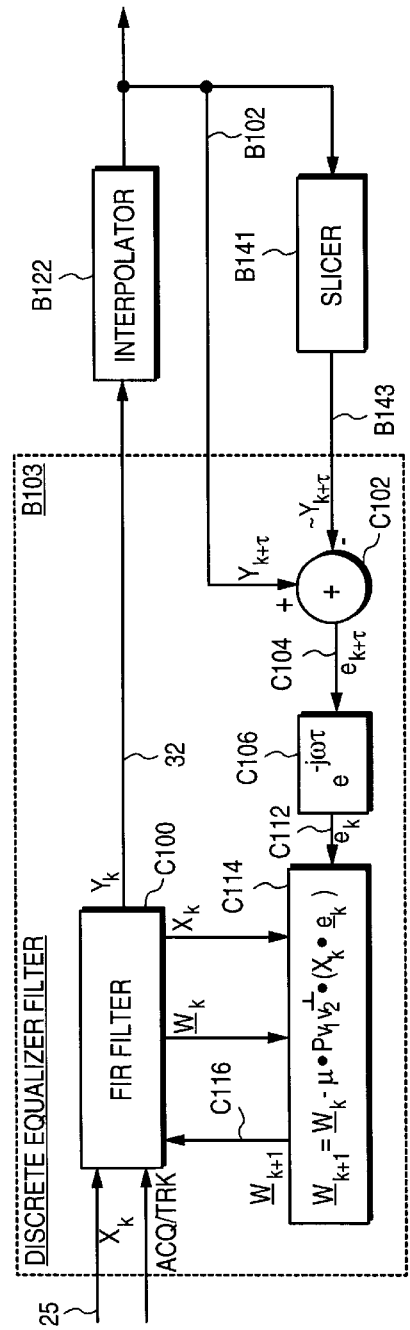
FIG. 8B shows the adaptive, discrete time equalizer of the present invention.

FIG. 8B illustrates operation of the adaptive, discrete time equalizer filter B103 of the present invention. Sample values from the A/D 24 are input over line 25 to a discrete time FIR filter C100 comprising a predetermined number of coefficients, the values of which determine the filter's gain and phase response. Because the FIR filter C100 operates on the sample values prior to the interpolated timing recovery loop B100, its order can be increased over the prior art without adversely affecting the latency of timing recovery (i.e., the number of filter coefficients can be increased).

The output $Y_k$ 32 of the FIR filter C100 is input into the interpolator B122 for generating the interpolated sample values $Y_{k+\tau}$ B102. The interpolated sample values $Y_{k+\tau}$ B102 are input into a slicer B141 (FIG. 4B) which generates estimated sample values ~$Y_{k+\tau}$. The estimated sample values ~$Y_{k+\tau}$ are subtracted from the interpolated sample values $Y_{k+\tau}$ at adder C102 to generate a sample error value $e_{k+\tau}$ C104 that is synchronized to the baud rate rather than the sample rate. Because the LMS algorithm operates on sample values $X_k$ at the sample rate, it is necessary to convert the error value $e_{k+\tau}$ C104 into an error value $e_k$ C112 synchronous to the sample rate. This is accomplished by an interpolation circuit C106 which computes an interpolated error value $e_k$ C112 from the baud rate error values $e_{k+\tau}$ C104. Preferably, the error value interpolation circuit C106 is implemented as a first order linear interpolation, but it may be a simple zero order hold, or a more complex interpolation filter as described above.

Figure 8C:
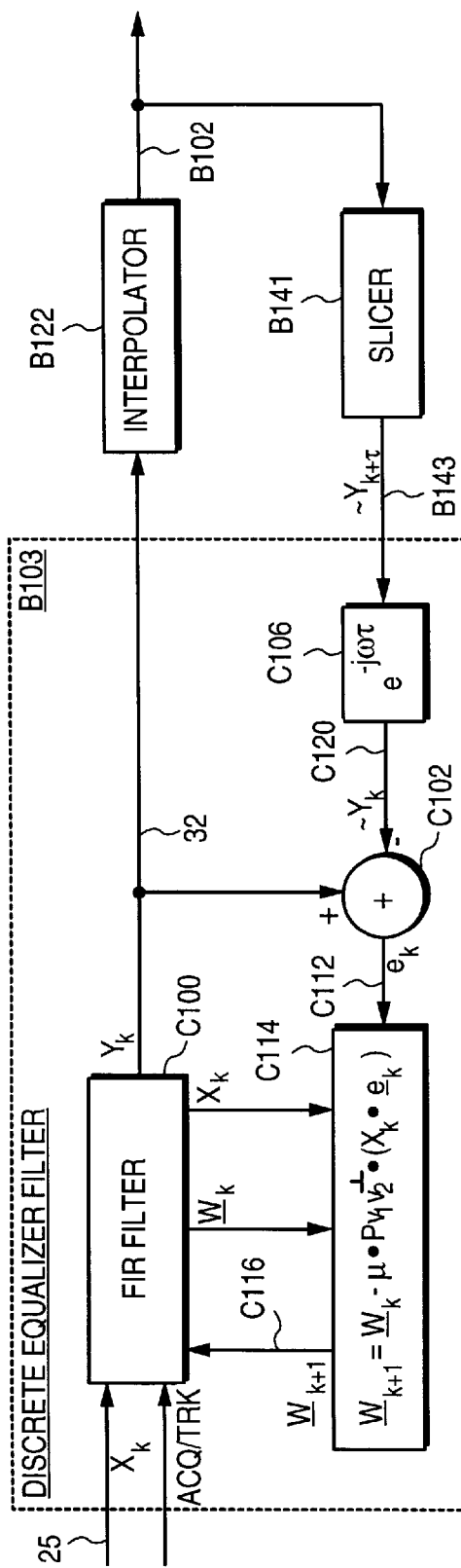
FIG. 8C shows an alternative embodiment for the adaptive, discrete time equalizer of the present invention.

FIG. 8C shows an alternative embodiment for generating the error value $e_k$. As illustrated, the estimated ideal sample values ~$Y_{k+\tau}$ from the slicer B141 are interpolated by the interpolation circuit C106 to generate estimated ideal sample values ~$Y_k$ C120 which are subtracted C102 from the equalized sample values $Y_k$ 32 at the output of the FIR filter C10 to generate the error value $e_k$.

In both embodiments, the error value $e_k$ C112 is input into a modified LMS circuit C114 which computes updated filter coefficients $W_{k+1}$ C116 according to, $$\underline{W}_{k+1} = \underline{W}_k - \mu \cdot Pv_1 v_2^{\perp} \cdot (X_k \cdot \underline{e}_k)$$

where the operation $Pv_1 v_2^{\perp}$ is an orthogonal projection operation which constrains the gain and phase response of the FIR filter C100 in order to attenuate interference from the gain and timing loops.

Figure 9A:
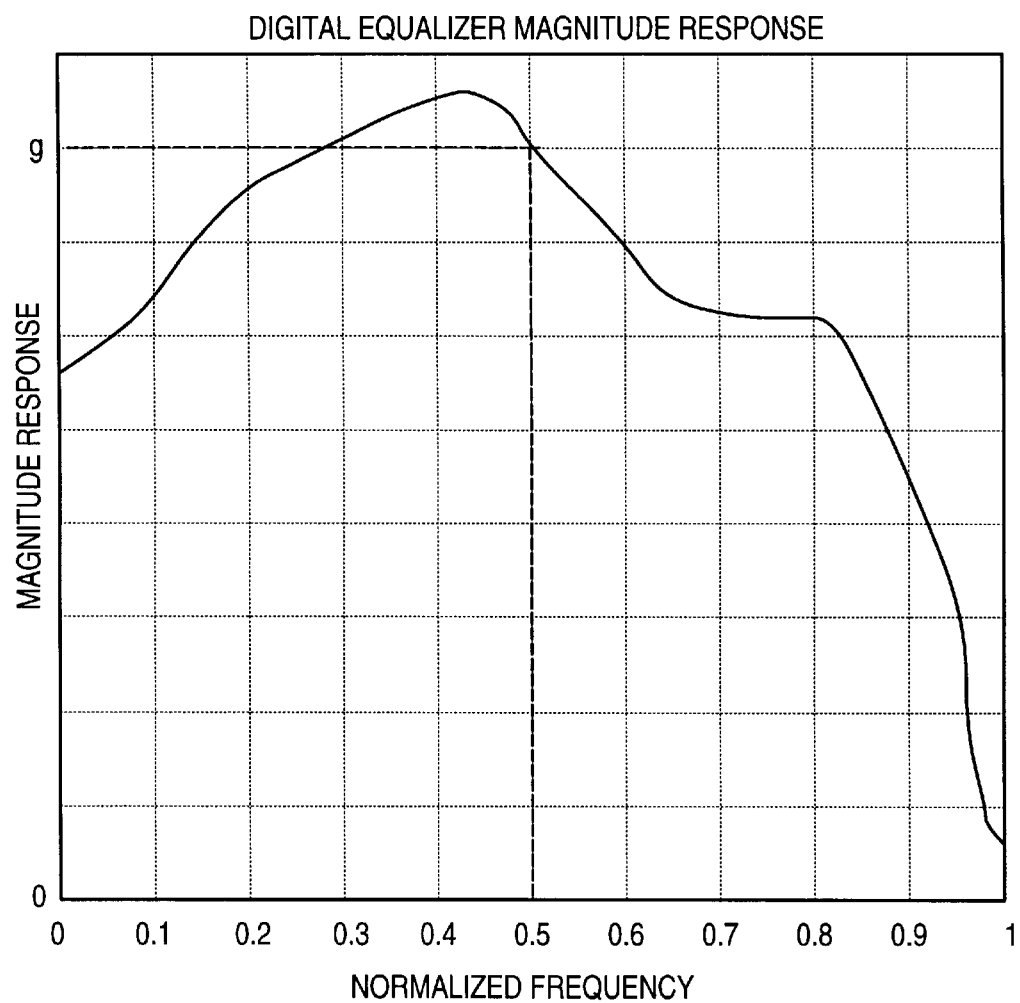
FIG. 9A illustrates the present invention adaptive filter's gain response constrained at a normalized frequency of 1/4T.
Figure 9B:
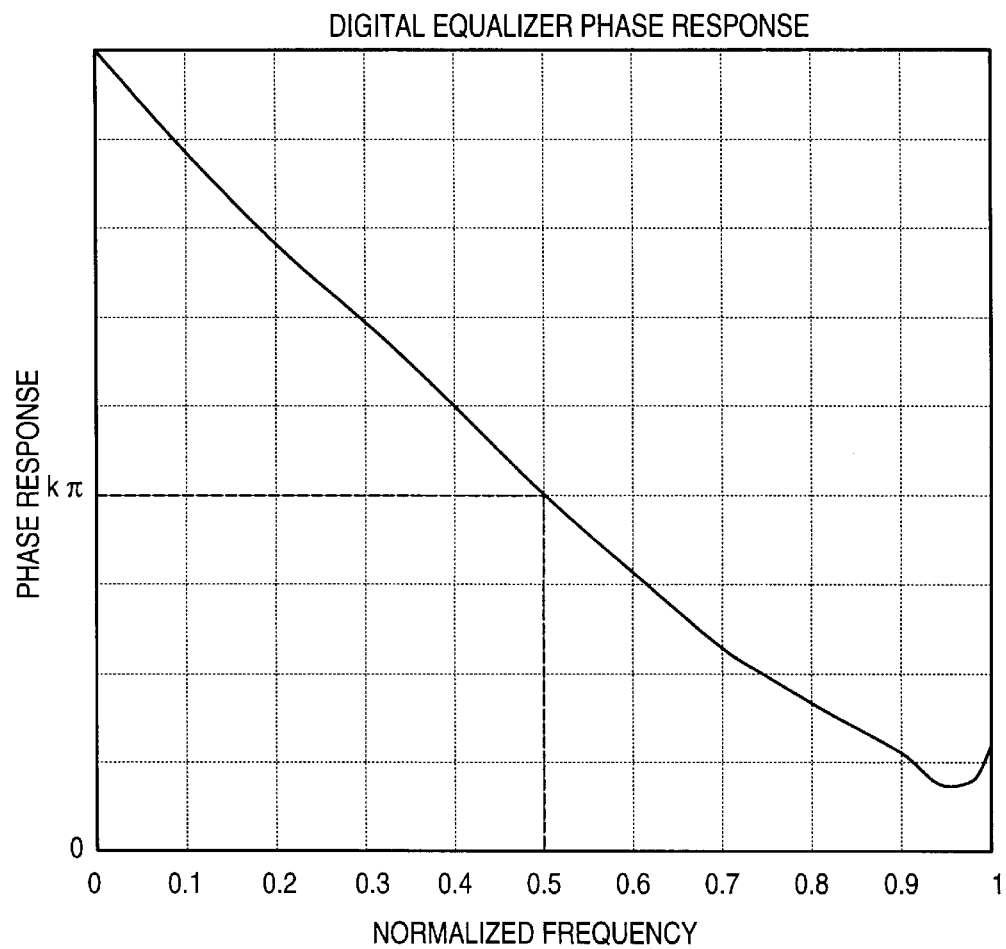
FIG. 9B shows the present invention adaptive filter's phase response constrained at a normalized frequency of 1/4T.

Operation of the orthogonal projection operation $Pv_1 v_2^{\perp}$ will now be described in relation to the gain and phase response of the FIR filter C100. FIGS. 9A and 9B show an example gain and phase response, respectively, for the FIR filter C100 of the present invention. The gain and phase response vary over time as the filter adapts to parameter changes in the recording system; that is, the filter continuously adjusts the channel's overall frequency response so that it matches the desired partial response (PR4, EPR4, EEPR4, etc.) as best possible. In the present invention, interference from the timing recovery and gain control loops is attenuated by constraining the gain and phase response of the FIR filter C100 at a predetermined frequency using an orthogonal projection operation $Pv_1 v_2^{\perp}$.

Referring again to FIG. 9A, the gain (magnitude) response of the FIR filter C100 has been constrained to a predetermined value (denoted by g) at the normalized frequency of 0.5 (¼Ts). Similarly, the phase response of the FIR filter C100 has been constrained to kπ at the normalized frequency of 0.5 as shown in FIG. 9B. In effect, these constraints allow the gain and phase to vary (adapt) at all frequencies except at the normalized frequency of 0.5, thereby constraining the filter's frequency response in a manner that attenuates interference from the gain and timing loops. The gain constraint g is relatively arbitrary except that it is selected to optimize the dynamic range of the filter's coefficients. However, constraining the filter's response at the normalized frequency of 0.5 and selecting a phase constraint of kπ reduces the complexity of the orthogonal projection operation $Pv_1 v_2^{\perp}$ and simplifies implementation of the zero phase start circuit B163 (FIG. 4B) and sync mark detector 66 (FIG. 1).

As mentioned above, the zero phase start circuit B163 (FIG. 4B) minimizes the initial phase error between the interpolated sample values and the baud rate at the beginning of acquisition by computing an initial phase error τ from the A/D 24 sample values 25 and then loading this initial phase error into the modulo-Ts accumulator B120. To compute the initial phase error τ, the zero phase start circuit B163 must take into account the phase delay of the adaptive equalizer filter B103 since interpolated timing recovery B100 operates on the equalized samples 32, not the A/D 24 samples 25. With the acquisition preamble 68 (FIG. 2B) having a frequency of ¼T (i.e., 0.5 normalized), constraining the phase response of the adaptive equalizer B103 at the preamble frequency (¼TS) fixes the phase delay of the equalizer B103 during acquisition, thereby allowing the zero phase start circuit B163 to accurately compute the initial phase error τ. Furthermore, since the phase constraint at the preamble frequency is fixed at kπ, the phase delay of the equalizer B103 will either be zero or 180° (i.e., the adjustment to the initial phase error is nothing or a sign change).

Constraining the phase response of the adaptive equalizer B103 to kπ at the preamble frequency also simplifies implementation of the sync mark detector 66 (FIG. 1) in sampled amplitude read channels that use the conventional synchronous sampling timing recovery 28 (FIG. 4A) rather than interpolated timing recovery B100 (FIG. 4B). Operation of the sync mark detector 66 is described in detail in the above referenced co-pending U.S. patent application Ser. No. 08/533,797 entitled "Improved Fault Tolerant Sync Mark Detector For Sampled Amplitude Magnetic Recording." As described therein, the sync mark detector 66 is enabled coherent with the end of the acquisition preamble 68 and relative to the transport delay from the output of the A/D 24 to the sync mark detector 66. With an adaptive equalizer, the transport delay will vary unless the filter's phase response is constrained at the acquisition preamble frequency by, for example, using an orthogonal projection operation $Pv_1v_2^\perp$ of the present invention.

Turning now to the implementation details of the orthogonal projection operation $Pv_1v_2^\perp$ the equalizer's frequency response is $$C(e^{j2\pi f}) = \sum_k C_k e^{-jk2\pi fT}$$

where $C_k$ are the coefficients of the equalizer's impulse response. At the preamble frequency (¼T), the equalizer's frequency response is $$C(e^{j\frac{\pi}{2}}) = \sum_k C_k e^{-jk\frac{\pi}{2}}$$

where the sampling period has been normalized to T=1. In matrix form, the equalizer's frequency response at the preamble frequency is, $$C(e^{j\frac{\pi}{2}}) = \underline{C}^T \begin{bmatrix} (e^{j\frac{\pi}{2}})^0 \\ (e^{j\frac{\pi}{2}})^{-1} \\ \vdots \\ (e^{j\frac{\pi}{2}})^{-N-1} \end{bmatrix} = \underline{C}^T \begin{bmatrix} (j)^0 \\ (j)^{-1} \\ \vdots \\ (j)^{-(N-1)} \end{bmatrix} = \underline{C}^T \begin{bmatrix} 1 \\ -j \\ -1 \\ j \\ \vdots \end{bmatrix}$$

Those skilled in the art will recognize that shifting the time base will lead to four different, but functionally equivalent, frequency responses at the preamble frequency (i.e., [1, −j, −1, j, . . . ]C, [−j, −1, j, 1, . . . ]C, [−1, j, 1, −j, . . . ]C and [j, 1, −j, −1, . . . ]C). Constraining the phase response of the equalizer B103 to an integer multiple of π at the preamble frequency (¼T) implies that the imaginary component of its frequency response is zero, $$\underline{C}^T \begin{bmatrix} 0 \\ -1 \\ 0 \\ 1 \\ \vdots \end{bmatrix} = \underline{C}^T \cdot V_1 = 0$$

If the imaginary component of the frequency response is constrained to zero, as described above, then constraining the magnitude of the equalizer to g at the preamble frequency (¼T) implies that the real component of the frequency response equals g, $$\underline{C}^T \begin{bmatrix} 1 \\ 0 \\ -1 \\ 0 \\ \vdots \end{bmatrix} = \underline{C}^T \cdot V_2 = g$$

Therefore, the equalizer's coefficients $C_k$ must be constrained to satisfy the following two conditions:

$$\underline{C}^T \cdot V_1 = 0$$

and $$\underline{C}^T \cdot V_2 = g.$$

The above constraints are achieved by multiplying the computed gradient $X_k \cdot \underline{e}_k$ by an orthogonal projection operation $Pv_1v_2^\perp$ as part of a modified LMS algorithm C114.

Figure 10:
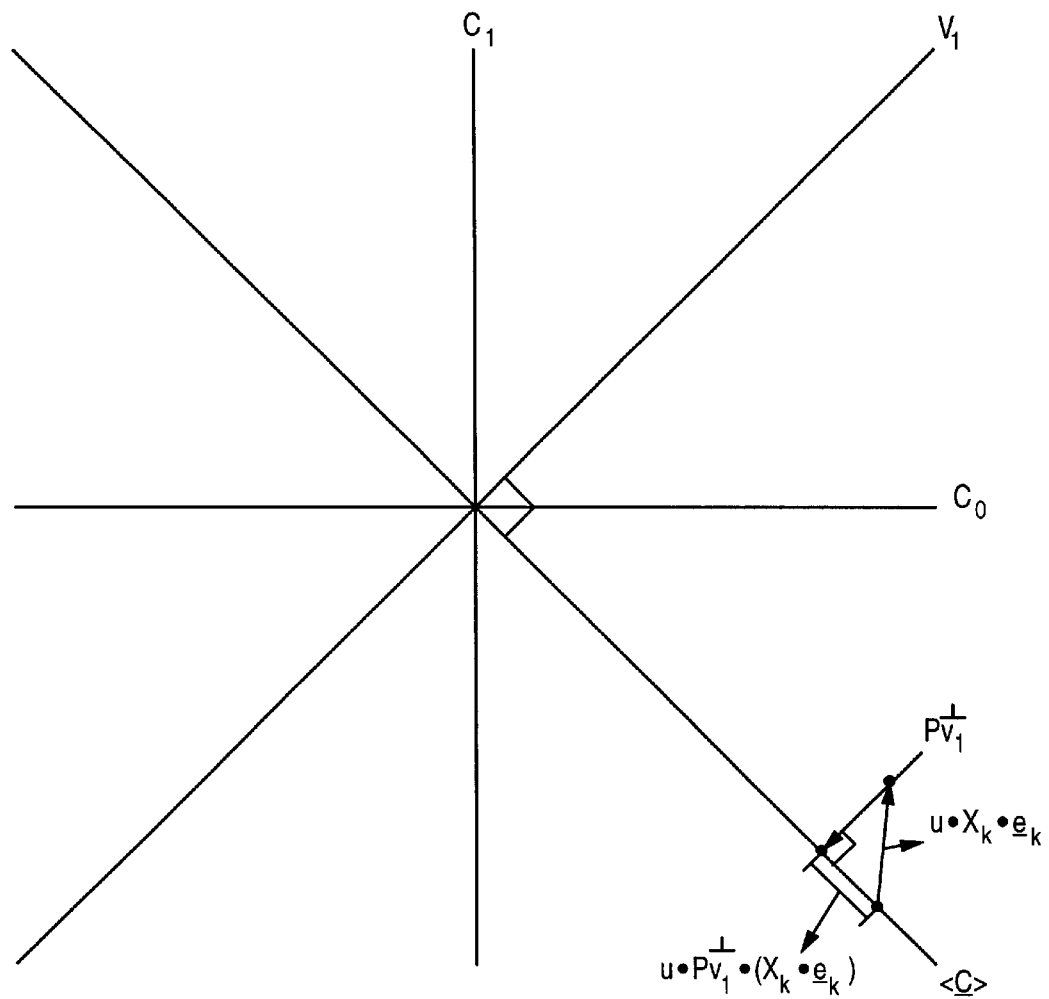
FIG. 10 illustrates operation of an orthogonal projection operation of the present invention for constraining the gain and phase response of the adaptive filter.

To understand the operation of the orthogonal projection operation, consider an equalizer that comprises only two coefficients: $C_0$ and $C_1$ as shown in FIG. 10. The phase constraint condition $C^T V_1 = 0$ implies that the filter coefficient vector $C^T$ must be orthogonal to $V_1$. When using an unmodified LMS algorithm to update the filter coefficients, the orthogonal constraint is not always satisfied as shown in FIG. 10. The present invention, however, constrains the filter coefficients to a subspace $<\underline{C}>$ which is orthogonal to $V_1$ by multiplying the gradient values $X_k \cdot \underline{e}_k$ by a projection operation $Pv_1^\perp$, where the null space of the projection operation $Pv_1^\perp$ is orthogonal to $<\underline{C}>$. The updated coefficients correspond to a point on the orthogonal subspace $<\underline{C}>$ closest to the coefficients derived from the unmodified LMS algorithm as shown in FIG. 10.

Similar to the phase constraint projection operation $Pv_1^\perp$, a second orthogonal projection operation $Pv_2^\perp$ constrains the filter coefficients such that the coefficient vector $\underline{C}^T$ satisfies the above gain constraint: $\underline{C}^T \cdot V_2 = g$. The combined orthogonal projection operation $Pv_1v_2^\perp$ eliminates two degrees of freedom in an N-dimensional subspace where N is the number of filter coefficients (i.e., the orthogonal projection operation $Pv_1v_2^\perp$ has a rank of N−2).

An orthogonal projection operation for $V_1$ and $V_2$ can be computed according to $$Pv_x^\perp = I - Pv_x = I - V_x(V_x^T V_x)^{-1} V_x^T \quad (20)$$

where $Pv_1v_2^\perp = Pv_1^\perp \cdot Pv_2^\perp$ since $V_1$ is orthogonal to $V_2$. The orthogonal projection operation $Pv_1v_2^\perp$ computed using the above equation for an equalizer comprising ten filter coefficients is a matrix $$Pv_1v_2^\perp = \begin{bmatrix} 4 & 0 & 1 & 0 & -1 & 0 & 1 & 0 & -1 & 0 \\ 0 & 4 & 0 & 1 & 0 & -1 & 0 & 1 & 0 & -1 \\ 1 & 0 & 4 & 0 & 1 & 0 & -1 & 0 & 1 & 0 \\ 0 & 1 & 0 & 4 & 0 & 1 & 0 & -1 & 0 & 1 \\ -1 & 0 & 1 & 0 & 4 & 0 & 1 & 0 & -1 & 0 \\ 0 & -1 & 0 & 1 & 0 & 4 & 0 & 1 & 0 & -1 \\ 1 & 0 & -1 & 0 & 1 & 0 & 4 & 0 & 1 & 0 \\ 0 & 1 & 0 & -1 & 0 & 1 & 0 & 4 & 0 & 1 \\ -1 & 0 & 1 & 0 & -1 & 0 & 1 & 0 & 4 & 0 \\ 0 & -1 & 0 & 1 & 0 & -1 & 0 & 1 & 0 & 4 \end{bmatrix}$$

The matrix $Pv_1v_2^\perp$ is an orthogonal projection matrix scaled by 5 (multiplied by 5) so that it contains integer valued elements which simplifies multiplying by $X_k \underline{e}_k$ in the LMS update equation, $$\underline{W}_{k+1} = \underline{W}_k - \mu \cdot Pv_1v_2^\perp \cdot (X_k \underline{e}_k) \quad (21)$$

The scaling factor is taken into account in the selection of the gain value $\mu$. Constraining the gain to g and the phase to $k\pi$ at the normalized frequency of 0.5 simplifies implementing the orthogonal projection matrix $Pv_1v_2^\perp$: half of the elements are zero and the other half are either +1, −1, or +4. Thus, multiplying the projection matrix $Pv_1v_2^\perp$ by the gradient values $X_k \underline{e}_k$ requires only shift registers and adders.

The ACQ/TRK signal shown in FIG. 8B disables adaptation of the FIR filter during acquisition, that is, while acquiring the acquisition preamble 68 shown in FIG. 2B. Thus, the adaptive equalizer B103 adapts only after acquiring the acquisition preamble 68.

Reduced Cost Orthogonal Constraint Matrix

Even though the above orthogonal projection matrix $Pv_1v_2^\perp$ has a simple structure wherein half of the elements are zero, it may not be cost effective to directly implement it due to the significant number of shift and accumulate operations necessary to compute $Pv_1v_2^\perp \cdot (X_k \underline{e}_k)$. In order to reduce the cost and complexity, an alternative embodiment of the present invention decimates the modified LMS adaptation algorithm C114 as illustrated in FIGS. 11A, 11B, 11C and 11D.

A mathematical basis for the circuit of FIG. 11A will be discussed before describing the details of operation. Referring again to the above equation (20), $$Pv_x^\perp = I - Pv_x = I - V_x(V_x^T V_x)^{-1} V_x^T$$

by combining the above $V_1$ and $V_2$ vectors into a N×2 matrix $$V = \begin{bmatrix} +1 & 0 \\ 0 & -1 \\ -1 & 0 \\ 0 & +1 \\ \vdots & \vdots \end{bmatrix}$$

(those skilled in the art will recognize that shifting the time base provides four alternatives for the V matrix) then the operation $(V_x^T V_x)^{-1}$ of equation (20) reduces to $$\begin{bmatrix} \frac{1}{5} & 0 \\ 0 & \frac{1}{5} \end{bmatrix} = \frac{1}{5} I$$

Thus, equation (20) reduces to $$Pv^\perp = I - 1/5 \cdot VV^T. \quad (22)$$

Multiplying both sides of equation (22) by 5 provides $$5 \cdot Pv^\perp = 5 \cdot I - VV^T. \quad (23)$$

Referring again to equation (21), $$\underline{W}_{k+1} = \underline{W}_k - \mu \cdot Pv_1v_2^\perp \cdot (X_k \underline{e}_k)$$

setting $X_k \underline{e}_k = \underline{g}_k$ reduces equation (21) to $$\underline{W}_{k+1} = \underline{W}_k - \mu \cdot Pv^\perp \cdot \underline{g}_k = \underline{W}_k - \mu \cdot [5 \cdot \underline{g}_k - vv^T \cdot \underline{g}_k]. \quad (24)$$

Defining $\underline{\delta} = v^T \cdot \underline{g}_k$.

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix} \quad (25)$$

that is, $\delta_0 = g_0 - g_2 + \ldots$ and $\delta_1 = -g_1 + g_3 - \ldots$, then computing $vv^T \cdot \underline{g}_k$ $$\begin{bmatrix} +1 & 0 \\ 0 & -1 \\ -1 & 0 \\ 0 & +1 \\ \vdots & \vdots \end{bmatrix} \begin{bmatrix} \delta_0 \\ \delta_1 \end{bmatrix} = \begin{bmatrix} +\delta_0 \\ -\delta_1 \\ -\delta_0 \\ +\delta_1 \\ \vdots \end{bmatrix} \quad (26)$$

and computing $5 \cdot \underline{g}_k - vv^T \cdot \underline{g}_k$ provides $$5 \cdot \underline{g}_k - \begin{bmatrix} +\delta_0 \\ -\delta_1 \\ -\delta_0 \\ +\delta_1 \\ \vdots \end{bmatrix} = \begin{bmatrix} 5g_0 - \delta_0 \\ 5g_1 + \delta_1 \\ 5g_2 + \delta_0 \\ 5g_3 - \delta_1 \\ \vdots \end{bmatrix} \quad (27)$$

Figure 11A:
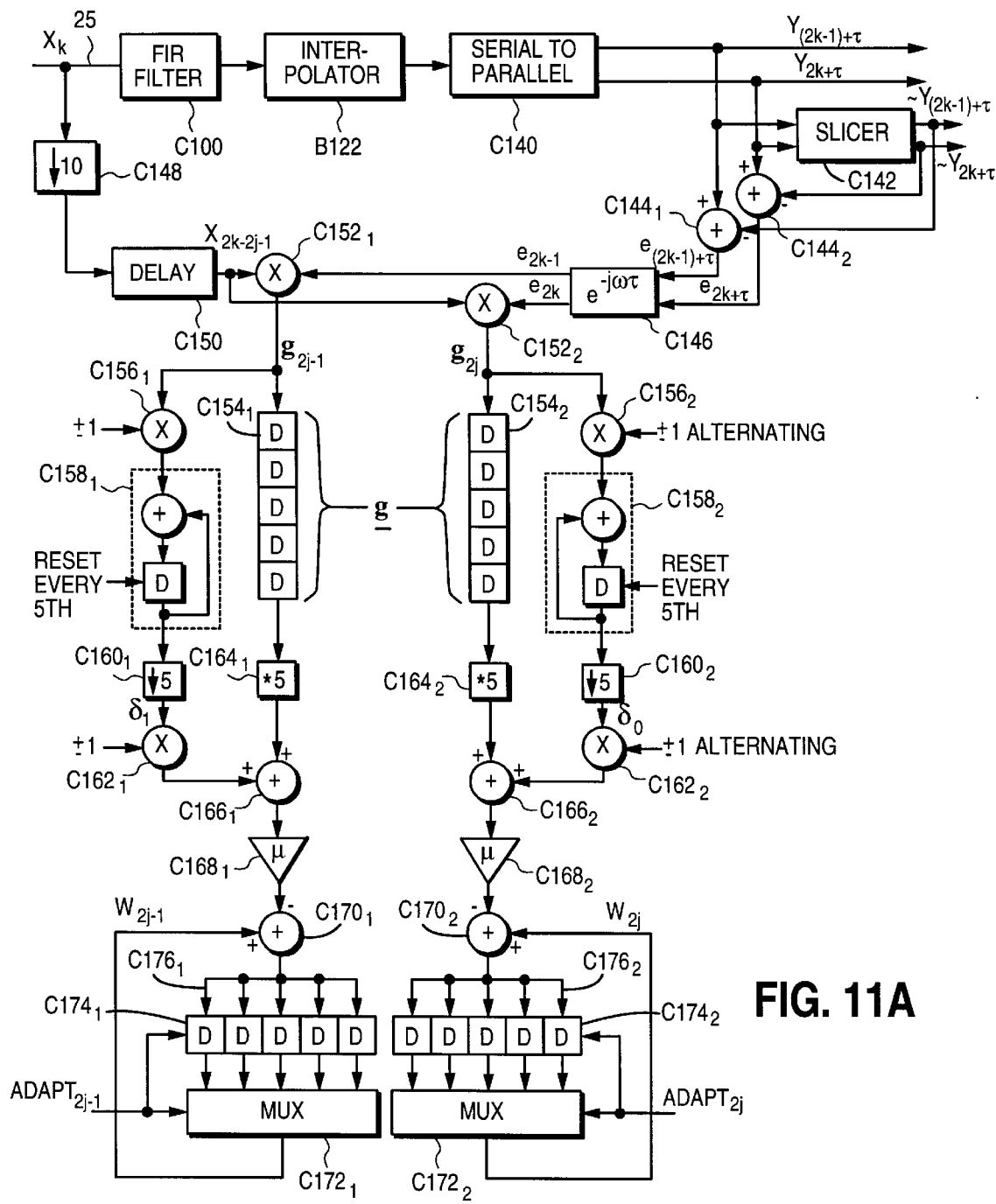
FIG. 11A shows an implementation for a reduced cost orthogonal projection operation.

FIG. 11A implements the above equations (25), (26), (27) and ultimately equation (21) in order to update the coefficients of the equalizer filter C100 according to the modified LMS adaptation algorithm of the present invention. To further reduce the implementation cost, the circuit of FIG. 11A decimates the adaptation algorithm by the number of filter coefficients (10 in the example shown); that is, the adaptation algorithm operates only on every tenth sample value rather than on every sample value and updates only one filter coefficient per clock period. This is illustrated by expanding equation (24)

$$\begin{bmatrix} W_{(k+1)0} \\ W_{(k+2)1} \\ W_{(k+3)2} \\ W_{(k+4)3} \\ \vdots \end{bmatrix} = \begin{bmatrix} W_{(k+0)0} \\ W_{(k+1)1} \\ W_{(k+2)2} \\ W_{(k+3)3} \\ \vdots \end{bmatrix} - \mu \cdot \begin{bmatrix} 5g_{(k+0)0} - \delta_{(k+0)0} \\ 5g_{(k+1)1} + \delta_{(k+1)1} \\ 5g_{(k+2)2} + \delta_{(k+2)0} \\ 5g_{(k+3)3} - \delta_{(k+3)1} \\ \vdots \end{bmatrix} \quad (28)$$

where k+i is the clock period and $g_{(i)j}=X_{i-j} \cdot e_i$. Thus, at each clock period, the next gradient value $g_{(i)j}$ can be computed by multiplying a sample value latched every tenth clock cycle by the next error value $e_i$. The new gradient $g_{(i)j}$ is then used to update the corresponding filter coefficient $W_{(i)j}$ of equation (28).

Referring now to the circuit shown in FIG. 11A, the sample values $X_k$ are input into the discrete time equalizer filter C100 and the equalized sample values input into the interpolator B122 similar to FIG. 8B. A serial-to-parallel circuit C140 converts the interpolated sample values $Y_{k+\tau}$ into even and odd subsequences $Y_{2k+\tau}$ and $Y_{(2k-1)+\tau}$, where the notation 2k indicates that two new interpolated sample values are output from the serial-to-parallel circuit C140 at every other sample period. A slicer C142 generates the corresponding even and odd estimated subsequences $\sim Y_{2k+\tau}$ and $\sim Y_{(2k-1)+\tau}$ which are subtracted from the interpolated sample values at respective adders (C144$_1$,C144$_2$) to form an even and odd sample error sequences $e_{2k+\tau}$ and $e_{(2k-1)+\tau}$. An error value interpolation circuit C146, similar to that of FIG. 8B, generates the even and odd sample error sequences $e_{2k}$ and $e_{(2k-1)}$ which are synchronized to the A/D sample rate.

As mentioned above, the circuit of FIG. 11A decimates the adaptation algorithm of the present invention by the number of coefficients in the equalizer filter C100. For the example shown, the equalizer filter C100 has 10 filter coefficients; accordingly, a decimate by 10 circuit C148 loads a sample value into a delay register C150 every tenth sample period. Thereafter, the output of delay register C150 is represented by $X_{2k-2j-1}$ where: j=1->5 incremented by 2 at every other sample period. The output of the delay register C150 $X_{2k-2j-1}$ is multiplied by the sample errors $e_{2k}$ and $e_{(2k-1)}$ at respective multipliers (C152$_1$,C152$_2$) to form the gradient values $g_{2j}$ and $g_{2j-1}$ used in equation (24).

The gradient values $g_{2j}$ and $g_{2j-1}$ are then shifted into respective shift registers (C154$_1$,C154$_2$). To implement equation (27), the gradient values $g_{2j}$ and $g_{2j-1}$ are multiplied by respective alternating ±1 (C156$_1$,C156$_2$) and accumulated in respective accumulators (C158$_1$,C158$_2$). After accumulating 5 gradient values in each accumulator (C158$_1$, C158$_2$), the outputs of the accumulators (which represent $\delta_0$ and $\delta_1$ of equation (25)) are latched by respective decimate by 5 circuits (C160$_1$,C160$_2$) and the accumulators (C158$_1$, C158$_2$) are reset. The values $\delta_0$ and $\delta_1$ are then multiplied by respective alternating ±1 (C162$_1$,C162$_2$) to implement equation (26). The gradient values $g_{2j}$ and $g_{2j-1}$ at the outputs of the shift register (C154$_1$,C154$_2$) are multiplied by 5 (C164$_1$, C164$_2$) and the values $\delta_0$ and $\delta_1$ are subtracted therefrom at adders (C166$_1$,C166$_2$) in order to implement equation (27).

To finish the adaptive update algorithm (i.e., to implement equation (28)), the output of adders (C166$_1$,C166$_2$) are scaled by a gain factor $\mu$ (C168$_1$,C168$_2$) which is reduced by a factor of 5 to account for the scaled up projection operator. The output of the gain factor $\mu$ (C168$_1$,C168$_2$) is subtracted at adders (C170$_1$,C170$_2$) from the corresponding filter coefficient (W$_{2j-1}$,W$_{2j}$) selected by a multiplexor (C172$_1$,C172$_2$) from a bank of registers (C174$_1$,C174$_2$). The ADAPT$_{2j}$ signal selects the 2j$^{th}$ coefficient from the bank of registers (C174$_1$,C174$_2$) for updating. After subtracting the update value, the updated filter coefficient (C176$_1$,C176$_2$) is restored to the bank of registers (C174$_1$,C174$_2$) and used by the equalizer filter C100 during the next clock period to equalize the sample values according to its updated spectrum.

Figure 11B:
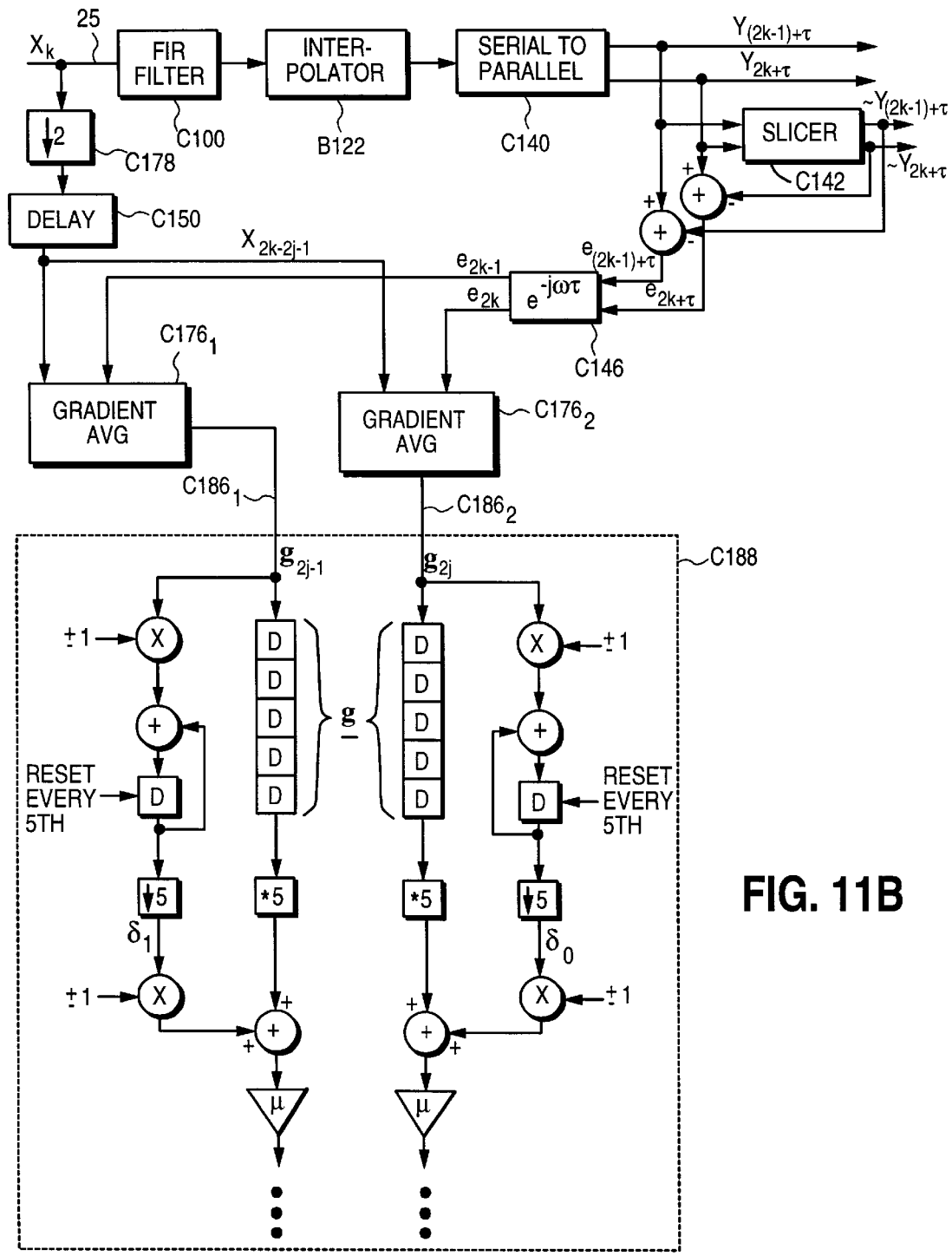
FIG. 11B shows an alternative embodiment for the reduced cost orthogonal projection operation.
Figure 11C:
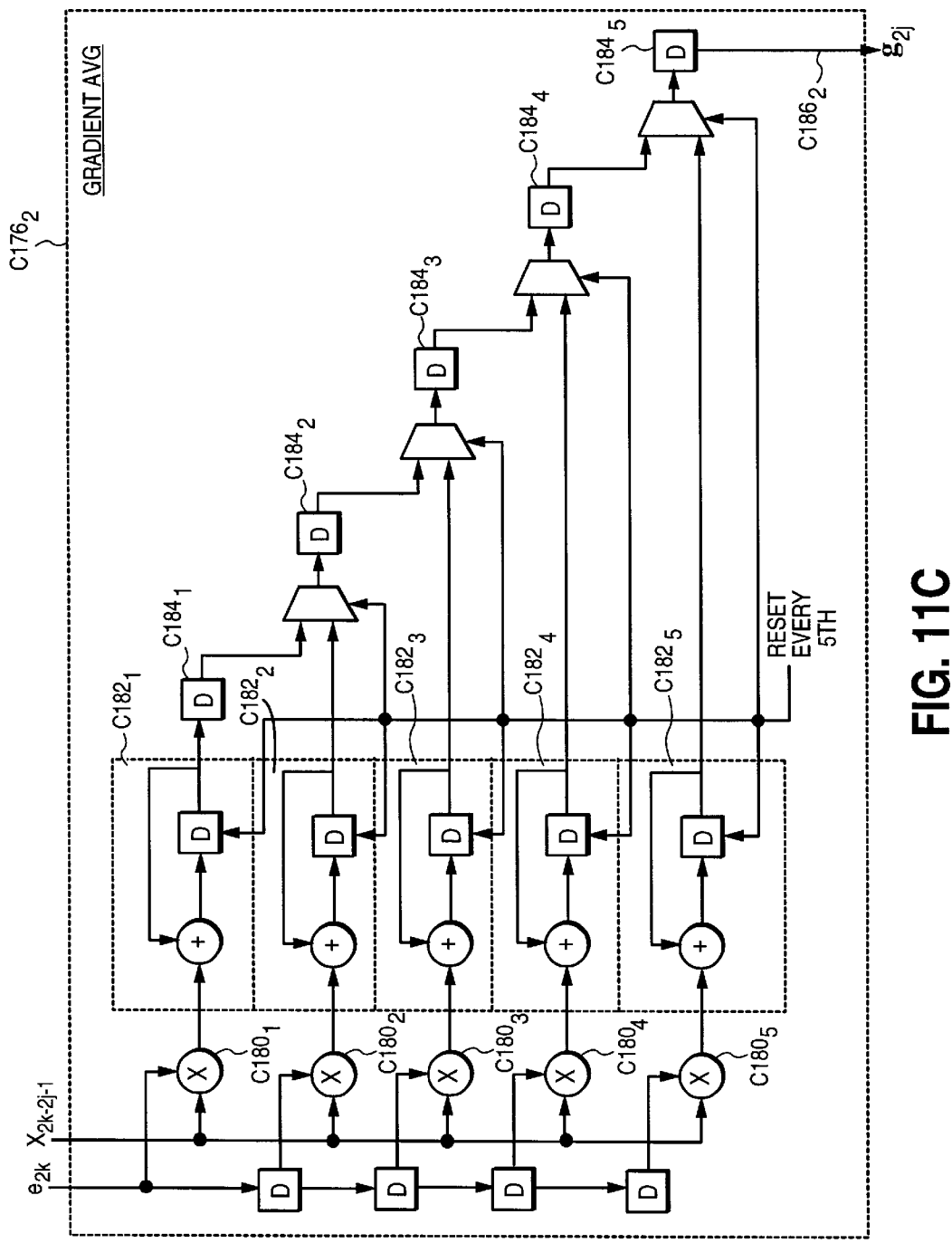
FIG. 11C illustrates an implementation for a gradient averaging circuit used in the reduced cost orthogonal projection operation of FIG. 11B.

Decimating the update algorithm by the number of filter coefficients, as in FIG. 11A, decreases the implementation complexity but at the cost of slowing convergence of the equalizer filter C100 toward an optimum setting. This is because the decimated update algorithm does not use all of the sample values to compute the gradients $g_j$. FIGS. 11B and 11C show an alternative embodiment of the decimated update algorithm of the present invention wherein more of the sample values are used to compute the gradients $g_j$, which adds complexity but improves performance because the equalizer filter C100 converges faster.

The circuit in FIG. 11B operates similar to the circuit in FIG. 11A described above except for the addition of respective gradient averaging circuits (C176$_1$,C176$_2$) which compute an averaged gradient $g_{2j-1}$ and $g_{2j}$ over several sample values, $$g_{2kj} = \frac{1}{N}\sum_{n=0}^{N-1} e_{2k-n} \cdot X_{2k-2j-n} \quad (29)$$

where N is a predetermined number of sample values out of the number of equalizer filter taps. In one embodiment, all of the sample values could be used (i.e., a number of sample values equal to the number filter taps), or in an alternative embodiment, a decimated number of sample values could be used in order to reduce the complexity and cost.

FIG. 11C shows an embodiment of the gradient averaging circuits (C176$_1$,C176$_2$) wherein the number of sample values is decimated by 2; that is, 5 out of the 10 sample values corresponding to the 10 equalizer filter taps are used to compute the averaged gradients $g_{2j-1}$ and $g_{2j}$.

In operation, a decimate by 2 circuit C178 of FIG. 11B stores every other sample value in the delay register C150. The output of the delay register C150 is multiplied (C180$_1$–180$_5$) by the error value $e_{2k}$ and delayed versions of the error value $e_{2k-n}$, and the results are accumulated in accumulators (C182$_1$–182$_5$). After accumulating five gradients, the contents of the accumulators (C182$_1$–182$_5$) are transferred to registers (C184$_1$–184$_5$), and the accumulators (C182$_1$–182$_5$) are cleared. Then, at every other sample period, the contents of registers (C184$_1$–184$_5$) are shifted from left to right (i.e., C184$_5$=C184$_4$; C184$_4$=C184$_3$; etc.) and the output of register C184$_5$ is the averaged gradient $g_{2j}$ output by the gradient averaging circuit (C176$_1$,C176$_2$). The averaged gradients $g_{2j}$ and $g_{2j-1}$ (C186$_1$,C186$_2$) are then used to update the coefficients of the equalizer filter C100 using circuitry C188 in the same manner as described with reference to FIG. 11A.

Figure 11D:
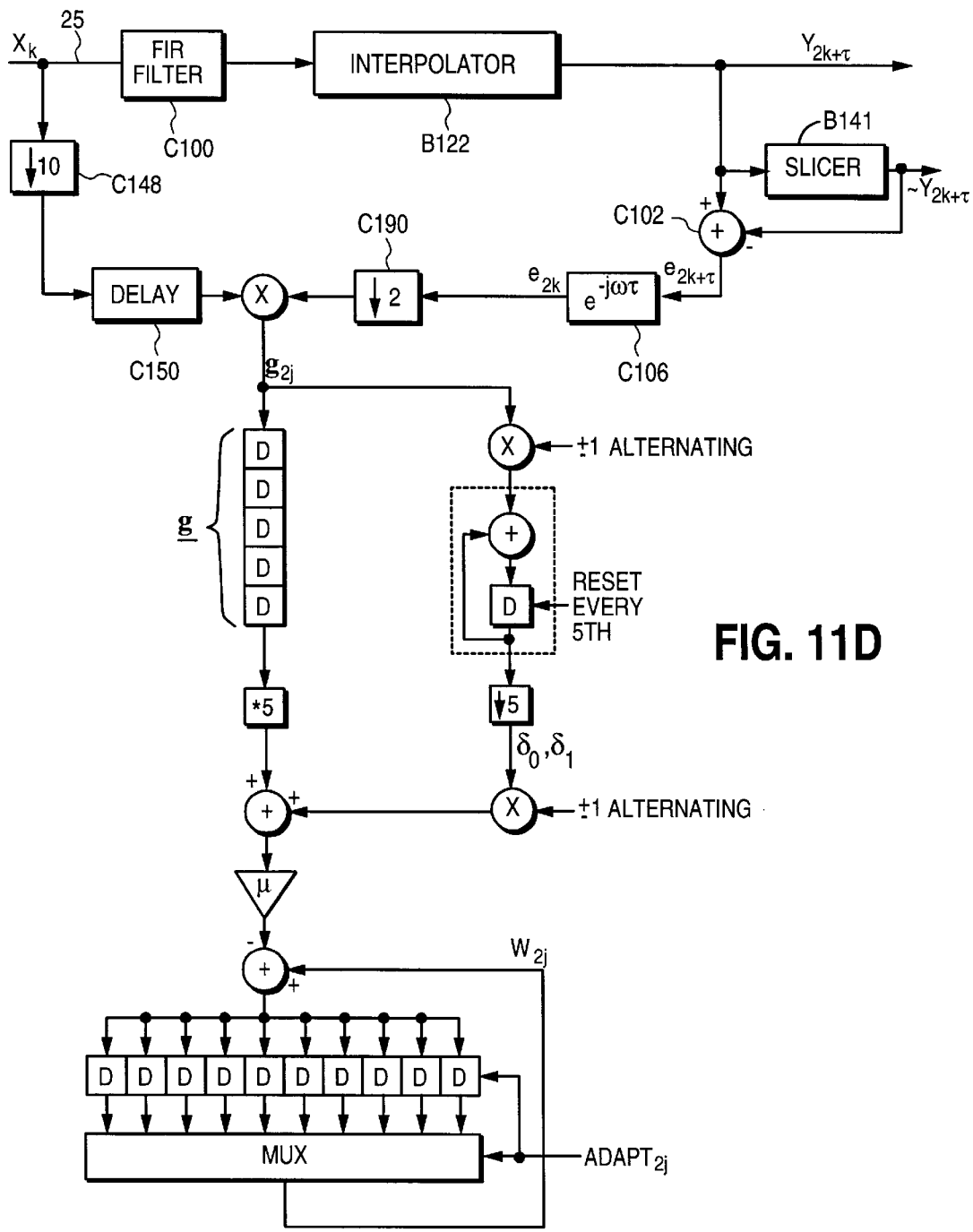
FIG. 11D shows yet another alternative embodiment for the reduced cost orthogonal projection operation of the present invention.

FIG. 11D illustrates yet another embodiment of the present invention which further reduces the cost and complexity, as compared to FIG. 11A, by updating the even and odd filter coefficients sequentially. That is, during the first N periods (where N is the number of filter coefficients) the circuit of FIG. 11D computes the coefficient update values of equation (28) for the even filter coefficients (W$_0$, W$_2$, W$_4$, . . . ), and then during the next N sample periods it computes the update values for the odd filter coefficients (W$_1$, W$_3$, W$_5$ . . . ). A decimation circuit C190 decimates the error value $e_k$ by two, and approximately half the circuitry as that of FIG. 11A is used to compute the update values. The decimate by two circuit C190 is actually syncopated; that is, it outputs the error values for k=0, k=2, k=4, k=6, k=8, and then outputs the error values for k=9, k=11, k=13, k=15, k=17 (assuming the adaptive filter C100 comprises ten filter taps).

Mathematically, operation of the update circuit in FIG. 11D can be described by, $$\begin{bmatrix} W_{(k+1)0} \\ W_{(k+3)2} \\ W_{(k+5)4} \\ W_{(k+7)6} \\ W_{(k+9)8} \\ W_{(k+10)1} \\ W_{(k+12)3} \\ W_{(k+14)5} \\ W_{(k+16)7} \\ W_{(k+18)9} \end{bmatrix} = \begin{bmatrix} W_{(k+0)0} \\ W_{(k+2)2} \\ W_{(k+4)4} \\ W_{(k+6)6} \\ W_{(k+8)8} \\ W_{(k+9)1} \\ W_{(k+11)3} \\ W_{(k+13)5} \\ W_{(k+15)7} \\ W_{(k+17)9} \end{bmatrix} - \mu \cdot \begin{bmatrix} 5g_{(k+0)0} - \delta_{(k+0)0} \\ 5g_{(k+2)2} + \delta_{(k+2)0} \\ 5g_{(k+4)4} - \delta_{(k+4)0} \\ 5g_{(k+6)6} + \delta_{(k+6)0} \\ 5g_{(k+8)8} - \delta_{(k+8)0} \\ 5g_{(k+9)1} + \delta_{(k+9)1} \\ 5g_{(k+11)3} - \delta_{(k+11)1} \\ 5g_{(k+13)5} + \delta_{(k+13)1} \\ 5g_{(k+15)7} - \delta_{(k+15)1} \\ 5g_{(k+17)9} + \delta_{(k+17)1} \end{bmatrix}$$

assuming the adaptive filter C100 comprises 10 filter taps.

Obviously, the embodiment of FIG. 11D will decrease the performance of the adaptive filter C100 due to the decrease in convergence speed. However, the gradient averaging circuit of FIG. 11C can be used to improve the performance of the circuit in FIG. 11D, similar to the embodiment of FIG. 11B. Thus in the embodiments of FIG. 11A–11D, the performance versus cost and complexity varies—the preferred configuration is selected according to the requirements of the user.

Although the interpolated timing recovery and adaptive equalizer of the present invention have been disclosed in relation to a d=0 PR4 read channel, the principles disclosed herein are equally applicable to other types of sampled amplitude read channels including d=1 EPR4 or EEPR4 read channels. In a d=1 read channel, for example, the slicer B141 of FIG. B4A is replaced by a pulse detector as described in the above reference U.S. Pat. No. 5,359,631.

Furthermore, the particular constraint frequency of ¼Ts used in the disclosed embodiment is not intended to be limiting. Other constraint frequencies could be used without departing from the scope of the present invention. For example, a 3T preamble could be used in which case the constraint frequency would be ⅙Ts (if constraining to the preamble frequency).

Still further, those skilled in the art will appreciate the many obvious modifications that are possible to the adaptive equations disclosed herein. For example, a shift in the time base would change the FIR filter's magnitude and phase response at the constraint frequency which would result in different $V_1$ and $V_2$ matrices. Also, the modified LMS algorithm, $$\underline{W}_{k+1} = \underline{W}_k - \mu \cdot P v_1 v_2^\perp \cdot (X_k e_k)$$

could be implemented after rearranging terms, $$\underline{W}_{k+1} = \underline{W}_k - \mu \cdot e_k \cdot (P v_1 v_2^\perp \cdot \underline{X}_k)$$

or $$\underline{W}_{k+1} = \underline{W}_k - \mu \cdot X_k \cdot (P v_1 v_2^\perp \cdot \underline{e}_k).$$

These, and like modifcations, are within the scope of the present invention.

The objects of the invention have been fully realized through the embodiments disclosed herein. Those skilled in the art will appreciate that the various aspects of the invention can be achieved through different embodiments without departing from the essential function. The particular embodiments disclosed are illustrative and not meant to limit the scope of the invention as appropriately construed by the following claims.

TABLE B2

| τ·32/Ts | C(−2) | C(−1) | C(0) | C(1) | C(2) | C(3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

We claim:

1. A sampled amplitude read channel for reading digital data from a sequence of discrete time sample values generated by sampling an analog read signal from a read head positioned over a magnetic medium, comprising:
   (a) a sampling device for sampling the analog read signal to generate the discrete time sample values;
   (b) a timing recovery circuit for synchronizing the discrete time sample values to a baud rate of the digital data;
   (c) an adaptive equalizer comprising more than three delay elements and a plurality of filter coefficients, responsive to the discrete time sample values, for generating equalized sample values according to a target response;
   (d) an orthogonal projection circuit for constraining a frequency response of the adaptive equalizer at a predetermined constraint frequency in order to attenuate interference from the timing recovery circuit; and
   (e) a discrete time sequence detector for detecting the digital data from the equalized sample values,
   wherein:
       the magnetic medium comprises a plurality of data sectors, each data sector comprising a user data field and a preceding acquisition preamble field recorded at a predetermined acquisition preamble frequency, the acquisition preamble field for synchronizing the timing recovery circuit before reading the user data field; and
       the predetermined constraint frequency is selected relative to the acquisition preample frequency.

2. The sampled amplitude read channel as recited in claim 1, wherein:

(a) the orthogonal projection circuit operates according to a least mean square algorithm, $$\underline{W}_{k+1} = \underline{W}_k - \mu \cdot Pv_1v_2^{\perp} \cdot (X_k \cdot \underline{e}_k)$$

(b) $\underline{W}_k$ are the filter coefficients;

(c) $\mu$ is a predetermined gain;

(d) $\underline{e}_k$ is a vector of error values computed as a function of an output of the equalizer and an estimated ideal value;

(e) $Pv_1v_2^{\perp}$ is an orthogonal projection matrix; and (f) $X_k$ is a discrete time sample value.

3. The sampled amplitude read channel as recited in claim 2, further comprising a decimator for decimating the discrete time sample values $\underline{X}_k$ input to the orthogonal projection circuit.

4. The sampled amplitude read channel as recited in claim 3, wherein the filter coefficients are updated according to $$\begin{bmatrix} W_{(k+1)0} \\ W_{(k+2)1} \\ W_{(k+3)2} \\ W_{(k+4)3} \\ \vdots \end{bmatrix} = \begin{bmatrix} W_{(k+0)0} \\ W_{(k+1)1} \\ W_{(k+2)2} \\ W_{(k+3)3} \\ \vdots \end{bmatrix} - \mu \cdot \begin{bmatrix} 5g_{(k+0)0} - \delta_{(k+0)0} \\ 5g_{(k+1)1} + \delta_{(k+1)1} \\ 5g_{(k+2)2} + \delta_{(k+2)0} \\ 5g_{(k+3)3} - \delta_{(k+3)1} \\ \vdots \end{bmatrix}$$

where:

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix}$$

and $\underline{g}_k = X_k \cdot \underline{e}_k$.

5. The sampled amplitude read channel as recited in claim 4, wherein $g_k$ is averaged according to:

$$g_{kj} = \frac{1}{N} \sum_{n=0}^{N-1} e_{k-n} \cdot X_{k-j-n}$$

where N is a predetermined integer.

6. The sampled amplitude read channel as recited in claim 3, wherein the filter coefficients are updated in even and odd subsequences sequentially, such that if the adaptive filter comprised ten filter coefficients, the filter coefficients would be updated according to:

$$\begin{bmatrix} W_{(k+1)0} \\ W_{(k+3)2} \\ W_{(k+5)4} \\ W_{(k+7)6} \\ W_{(k+9)8} \\ W_{(k+10)1} \\ W_{(k+12)3} \\ W_{(k+14)5} \\ W_{(k+16)7} \\ W_{(k+18)9} \end{bmatrix} = \begin{bmatrix} W_{(k+0)0} \\ W_{(k+2)2} \\ W_{(k+4)4} \\ W_{(k+6)6} \\ W_{(k+8)8} \\ W_{(k+9)1} \\ W_{(k+11)3} \\ W_{(k+13)5} \\ W_{(k+15)7} \\ W_{(k+17)9} \end{bmatrix} - \mu \cdot \begin{bmatrix} 5g_{(k+0)0} - \delta_{(k+0)0} \\ 5g_{(k+2)2} + \delta_{(k+2)0} \\ 5g_{(k+4)4} - \delta_{(k+4)0} \\ 5g_{(k+6)6} + \delta_{(k+6)0} \\ 5g_{(k+8)8} - \delta_{(k+8)0} \\ 5g_{(k+9)1} + \delta_{(k+9)1} \\ 5g_{(k+11)3} - \delta_{(k+11)1} \\ 5g_{(k+13)5} + \delta_{(k+13)1} \\ 5g_{(k+15)7} - \delta_{(k+15)1} \\ 5g_{(k+17)9} + \delta_{(k+17)1} \end{bmatrix}$$

where:

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix}$$

and $\underline{g}_k = X_k \cdot \underline{e}_k$.

7. The sampled amplitude read channel as recited in claim 6, wherein $g_k$ is averaged according to:

$$g_{kj} = \frac{1}{N} \sum_{n=0}^{N-1} e_{k-n} \cdot X_{k-j-n}$$

where N is a predetermined integer.

8. The sampled amplitude read channel as recited in claim 1, wherein the acquisition preamble field comprises a 2T pattern.

9. The sampled amplitude read channel as recited in claim 8, wherein:

(a) the predetermined constraint frequency is 1/4Ts; and (b) Ts is a sampling period of the sampling device.

10. The sampled amplitude read channel as recited in claim 1, wherein:

(a) the predetermined constraint frequency is 1/4Ts; and (b) Ts is a sampling period of the sampling device.

11. The sampled amplitude read channel as recited in claim 1, further comprising a zero phase start circuit, responsive to the discrete time sample values, for starting the timing recovery circuit before acquiring an acquisition preamble field.

12. The sampled amplitude read channel as recited in claim 1, further comprising a sync mark detector, responsive to a control signal from the timing recovery circuit, for detecting a sync mark recorded on the magnetic medium.

13. A sampled amplitude read channel for reading digital data from a sequence of discrete time sample values generated by sampling an analog read signal from a read head positioned over a magnetic medium, comprising:

(a) a sampling device for sampling the analog read signal to generate the discrete time sample values;

(b) a timing recovery circuit for synchronizing the discrete time sample values to a baud rate of the digital data;

(c) an adaptive equalizer comprising more than three delay elements, responsive to the discrete time sample values, for generating equalized sample values according to a target response;

(d) an orthogonal projection circuit for substantially constraining, at a predetermined constraint frequency, a phase frequency response of the adaptive equalizer at a predetermined phase setpoint in order to attenuate interference from the timing recovery circuit; and (e) a discrete time sequence detector for detecting the digital data from the equalized sample values, wherein:

the predetermined phase setpoint is $k\pi$; and k is an integer.

14. The sampled amplitude read channel as recited in claim 13, wherein:

(a) the predetermined constraint frequency is 1/4Ts; and (b) Ts is a sampling period of the sampling device.

15. A method of reading digital data from a sequence of discrete time sample values generated by sampling an analog read signal from a read head positioned over a magnetic medium, comprising the steps of:

(a) sampling the analog read signal to generate the discrete time sample values;

(b) synchronizing the discrete time sample values to a baud rate of the digital data;

(c) adaptively adjusting a plurality of filter coefficients of an adaptive equalizer in order to equalize the discrete time sample values into equalized sample values according to a target response;

(d) constraining a frequency response of the adaptive equalizer at a constraint frequency using an orthogonal projection operation in order to attenuate interference from the timing recovery circuit; and (e) detecting the digital data from the equalized sample values using a discrete time sequence detector, wherein:
the magnetic medium comprises a plurality of data sectors, each data sector comprising a user data field and a preceding acquisition preamble field recorded at a predetermined acquisition preamble frequency, the acquisition preamble field for synchronizing a timing recovery circuit before reading the user data field; and
the predetermined constraint frequency is selected relative to the acquisition preample frequency.

16. The method of reading digital data as recited in claim 15, wherein:

(c) the step of constraining operates according to a least mean square algorithm, $$\underline{W}_{k+1} = \underline{W}_k - \mu \cdot P v_1 v_2^{\perp} \cdot (X_k \cdot \underline{e}_k)$$

(d) $W_k$ are the filter coefficients;

(e) $\mu$ is a predetermined gain;

(f) $\underline{e}_k$ is a vector of error values computed as a function of an equalized sample value and an estimated ideal value;

(g) $P v_1 v_2^{\perp}$ is an orthogonal projection matrix; and (h) $X_k$ is a discrete time sample value.

17. The method of reading digital data as recited in claim 15, further comprising the step of decimating the orthogonal projection operation by a predetermined number.

18. The method of reading digital data as recited in claim 17, wherein the filter coefficients are updated according to:

$$\begin{bmatrix} W_{(k+1)0} \\ W_{(k+2)1} \\ W_{(k+3)2} \\ W_{(k+4)3} \\ \vdots \end{bmatrix} = \begin{bmatrix} W_{(k+0)0} \\ W_{(k+1)1} \\ W_{(k+2)2} \\ W_{(k+3)3} \\ \vdots \end{bmatrix} - \mu \cdot \begin{bmatrix} 5g_{(k+0)0} - \delta_{(k+0)0} \\ 5g_{(k+1)1} + \delta_{(k+1)1} \\ 5g_{(k+2)2} + \delta_{(k+2)0} \\ 5g_{(k+3)3} - \delta_{(k+3)1} \\ \vdots \end{bmatrix}$$

where:

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix}$$

and $\underline{g}_k = X_k \cdot \underline{e}_k$.

19. The method of reading digital data as recited in claim 18, further comprising the step of averaging $g_k$ according to:

$$g_{kj} = \frac{1}{N} \sum_{n=0}^{N-1} e_{k-n} \cdot X_{k-j-n}$$

where N is a predetermined integer.

20. The method of reading digital data as recited in claim 17, wherein the filter coefficients are updated in even and odd subsequences sequentially, such that if the adaptive filter comprised ten filter coefficients, the filter coefficients would be updated according to:

$$\begin{bmatrix} W_{(k+1)0} \\ W_{(k+3)2} \\ W_{(k+5)4} \\ W_{(k+7)6} \\ W_{(k+9)8} \\ W_{(k+10)1} \\ W_{(k+12)3} \\ W_{(k+14)5} \\ W_{(k+16)7} \\ W_{(k+18)9} \end{bmatrix} = \begin{bmatrix} W_{(k+0)0} \\ W_{(k+2)2} \\ W_{(k+4)4} \\ W_{(k+6)6} \\ W_{(k+8)8} \\ W_{(k+9)1} \\ W_{(k+11)3} \\ W_{(k+13)5} \\ W_{(k+15)7} \\ W_{(k+17)9} \end{bmatrix} - \mu \cdot \begin{bmatrix} 5g_{(k+0)0} - \delta_{(k+0)0} \\ 5g_{(k+2)2} + \delta_{(k+2)0} \\ 5g_{(k+4)4} - \delta_{(k+4)0} \\ 5g_{(k+6)6} + \delta_{(k+6)0} \\ 5g_{(k+8)8} - \delta_{(k+8)0} \\ 5g_{(k+9)1} + \delta_{(k+9)1} \\ 5g_{(k+11)3} - \delta_{(k+11)1} \\ 5g_{(k+13)5} + \delta_{(k+13)1} \\ 5g_{(k+15)7} - \delta_{(k+15)1} \\ 5g_{(k+17)9} + \delta_{(k+17)1} \end{bmatrix}$$

where:

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix}$$

and $\underline{g}_k = X_k \cdot \underline{e}_k$.

21. The method of reading digital data as recited in claim 20, further comprising the step of averaging $g_k$ according to:

$$g_{kj} = \frac{1}{N} \sum_{n=0}^{N-1} e_{k-n} \cdot X_{k-j-n}$$

where N is predetermined integer.

22. The method of reading digital data as recited in claim 15, wherein:

(a) the predetermined constraint frequency is 1/4Ts; and (b) Ts is a sampling period of the sampling step.

23. A sampled amplitude read channel for reading digital data from a sequence of discrete time sample values generated by sampling an analog read signal from a read head positioned over a magnetic medium, comprising:

(c) a sampling device for sampling the analog read signal to generate the discrete time sample values;

(d) a timing recovery circuit for synchronizing the discrete time sample values to a baud rate of the digital data;

(c) an adaptive equalizer comprising more than three delay elements and a plurality of filter coefficients, responsive to the discrete time sample values, for generating equalized sample values according to a target response;

(d) an orthogonal projection circuit for constraining a frequency response of the adaptive equalizer at a predetermined constraint frequency in order to attenuate interference from the timing recovery circuit;

(e) a discrete time sequence detector for detecting the digital data from the equalized sample values; and (f) a decimator for decimating the discrete time sample values input to the orthogonal projection circuit.

24. The sampled amplitude read channel as recited in claim 23, wherein:

(a) the orthogonal projection circuit operates according to a least mean square algorithm, $$\underline{W}_{k+1} = \underline{W}_k - \mu \cdot Pv_1v_2^{\perp} \cdot (X_k \cdot \underline{e}_k)$$

(b) $\underline{W}_k$ are the filter coefficients;

(c) $\mu$ is a predetermined gain;

(d) $\underline{e}_k$ is a vector of error values computed as a function of an output of the equalizer and an estimated ideal value;

(e) $Pv_1v_2^{\perp}$ is an orthogonal projection matrix; and (f) $X_k$ is a discrete time sample value.

25. The sampled amplitude read channel as recited in claim 24, wherein the filter coefficients are updated according to:

$$\begin{bmatrix} W_{(k+1)0} \\ W_{(k+2)1} \\ W_{(k+3)2} \\ W_{(k+4)3} \\ \vdots \end{bmatrix} = \begin{bmatrix} W_{(k+0)0} \\ W_{(k+1)1} \\ W_{(k+2)2} \\ W_{(k+3)3} \\ \vdots \end{bmatrix} - \mu \cdot \begin{bmatrix} 5g_{(k+0)0} - \delta_{(k+0)0} \\ 5g_{(k+1)1} + \delta_{(k+1)1} \\ 5g_{(k+2)2} + \delta_{(k+2)0} \\ 5g_{(k+3)3} - \delta_{(k+3)1} \\ \vdots \end{bmatrix}$$

where:

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix}$$

and $g_k = X_k \cdot \underline{e}_k$.

26. The sampled amplitude read channel as recited in claim 24, wherein the filter coefficients are updated in even and odd subsequences sequentially, such that if the adaptive filter comprised ten filter coefficients, the filter coefficients would be updated according to:

$$\begin{bmatrix} W_{(k+1)0} \\ W_{(k+3)2} \\ W_{(k+5)4} \\ W_{(k+7)6} \\ W_{(k+9)8} \\ W_{(k+10)1} \\ W_{(k+12)3} \\ W_{(k+14)5} \\ W_{(k+16)7} \\ W_{(k+18)9} \end{bmatrix} = \begin{bmatrix} W_{(k+0)0} \\ W_{(k+2)2} \\ W_{(k+4)4} \\ W_{(k+6)6} \\ W_{(k+8)8} \\ W_{(k+9)1} \\ W_{(k+11)3} \\ W_{(k+13)5} \\ W_{(k+15)7} \\ W_{(k+17)9} \end{bmatrix} - \mu \cdot \begin{bmatrix} 5g_{(k+0)0} - \delta_{(k+0)0} \\ 5g_{(k+2)2} + \delta_{(k+2)0} \\ 5g_{(k+4)4} - \delta_{(k+4)0} \\ 5g_{(k+6)6} + \delta_{(k+6)0} \\ 5g_{(k+8)8} - \delta_{(k+8)0} \\ 5g_{(k+9)1} + \delta_{(k+9)1} \\ 5g_{(k+11)3} - \delta_{(k+11)1} \\ 5g_{(k+13)5} + \delta_{(k+13)1} \\ 5g_{(k+15)7} - \delta_{(k+15)1} \\ 5g_{(k+17)9} + \delta_{(k+17)1} \end{bmatrix}$$

where:

$$\begin{bmatrix} +1 & 0 & -1 & 0 & \ldots \\ 0 & -1 & 0 & +1 & \ldots \end{bmatrix} \begin{bmatrix} g_0 \\ g_1 \\ g_2 \\ g_3 \\ \vdots \end{bmatrix} = \begin{bmatrix} \delta_0 \\ \delta_1 \end{bmatrix}$$

and $g_k = X_k \cdot \underline{e}_k$.

* * * * *